(12) United States Patent
Huang et al.

(10) Patent No.: US 12,468,664 B2
(45) Date of Patent: Nov. 11, 2025

(54) DATA READING METHOD AND TERMINAL

(71) Applicant: HUAWEI TECHNOLOGIES CO., LTD., Guangdong (CN)

(72) Inventors: Yongbing Huang, Beijing (CN); Tao Huang, Beijing (CN); Tingqiu Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 17/878,582

(22) Filed: Aug. 1, 2022

(65) Prior Publication Data

US 2022/0365680 A1 Nov. 17, 2022

Related U.S. Application Data

(63) Continuation of application No. PCT/CN2020/074294, filed on Feb. 4, 2020.

(51) Int. Cl.
*G06F 16/182* (2019.01)
*G06F 3/06* (2006.01)

(52) U.S. Cl.
CPC .......... *G06F 16/182* (2019.01); *G06F 3/0604* (2013.01); *G06F 3/0638* (2013.01); *G06F 3/067* (2013.01)

(58) Field of Classification Search
CPC ...... G06F 3/0604; G06F 3/0638; G06F 3/067; G06F 16/182
See application file for complete search history.

(56) References Cited

U.S. PATENT DOCUMENTS

| 10,650,022 B2* | 5/2020 | Bernbo ................... H04L 69/40 |
| 10,789,101 B2* | 9/2020 | Yoshida ................ G06F 9/4843 |
| 2006/0179037 A1 | 8/2006 | Turner et al. |
| 2008/0126357 A1* | 5/2008 | Casanova ........... G06F 16/1844 |
| 2013/0283398 A1* | 10/2013 | Wu .......................... G06F 21/60 726/28 |
| 2015/0012698 A1* | 1/2015 | Bolla .................... G06F 3/0641 711/113 |
| 2017/0093975 A1* | 3/2017 | Raghunath ............. H04L 67/56 |

(Continued)

FOREIGN PATENT DOCUMENTS

| CN | 104866331 A | 8/2015 |
| CN | 107396136 A | 11/2017 |
| CN | 109643302 A | 4/2019 |

(Continued)

*Primary Examiner* — Eric T Oberly

(57) ABSTRACT

In a data reading operation, a first terminal in a distributed storage system obtains a first data identifier, which is a unique identifier of first data in the distributed storage system. The first terminal determines, based on the first data identifier, whether first data is local data. When the first data is not local data, the first terminal obtains a first identifier that uniquely identifies the first data in the distributed storage system. The first terminal obtains, based on the first identifier, a second identifier corresponding to the first data and associated with content of the first data. The first terminal obtains, based on the second identifier, a read address that indicates that the first data is stored at a second terminal in the distributed storage system. The first terminal then retrieves the first data from the second terminal.

17 Claims, 21 Drawing Sheets

(56) References Cited

U.S. PATENT DOCUMENTS

2018/0189373 A1 7/2018 Shevade et al.
2021/0216507 A1* 7/2021 Nie .................... G06F 3/067

FOREIGN PATENT DOCUMENTS

CN 110178357 A 8/2019
KR 101564351 B1 10/2015
WO 2009062396 A1 5/2009

* cited by examiner

DATA READING METHOD AND TERMINAL

CROSS-REFERENCE TO RELATED APPLICATIONS

This application is a continuation of International Application No. PCT/CN2020/074294, filed on Feb. 4, 2020, the disclosure of which is hereby incorporated by reference in its entirety.

TECHNICAL FIELD

This application relates to the communication field, and in particular, to a data reading method and a terminal.

BACKGROUND

Computing performance, storage capacity, and read/write performance of smart devices are improving year by year. With improvement of communication technologies, a communication network of the smart devices achieves a low delay, high bandwidth, and the like. Therefore, the smart devices such as a smartphone, a smart TV, and a tablet computer are interconnected through a high-speed communication network, so that a single device develops into interconnected devices. This becomes an important form toward which devices are developing. The devices can access data of each other. However, data interworking cannot be conveniently implemented between the terminals due to incompatibility of operating systems and system structures between devices. Therefore, a manner in which terminals can access data of each other becomes an urgent problem to be resolved. For example, a plurality of household terminals cannot conveniently access data of each other due to incompatibility of operating systems.

SUMMARY

This application provides a data reading method and a terminal, to read and store data between terminals according to a mapping relationship between a unique identifier and a second identifier of data without modifying an application.

According to a first aspect, this application provides a first terminal, including:

a determining module, configured to obtain a first data identifier, and determine, based on the first data identifier, whether first data is local data, where the first data is data that the first terminal needs to read; and a data reading module, configured to: when the determining module determines that the first data is non-local data, obtain a first identifier of the first data, and obtain the first data based on the first identifier.

The first identifier is used to obtain a second identifier corresponding to the first data, the second identifier is associated with content of the first data, the second identifier is used to obtain a read address of the first data, and the read address of the first data indicates to address the first data from a second terminal.

Therefore, in this implementation of this application, the second identifier associated with the content of the first data may be obtained by using the first identifier of the first data, and then the first data is addressed by using the second identifier. The first data can be addressed even if the first data is stored in another apparatus or device, so that the first data is obtained across terminals, and cross-terminal data reading is implemented.

In a possible implementation, the first terminal further includes:

a file system module, configured to receive an access request for the first data, where the first data identifier is obtained based on the access request for the first data.

In this application, the first terminal may include the file system module, configured to: receive the access request for the data from an application, and process the access request, to obtain all or a part of content included in the first data identifier.

In a possible implementation, the file system module may be a virtual file system (virtual file system, VFS) in the terminal. In a possible implementation, the file system module may convert the received access request, to obtain the first data identifier. For example, the VFS may obtain storage path information of the first data based on a file name carried in the access request, and transfer the storage path information as the first data identifier to the determining module. This embodiment provides a specific manner of obtaining the first data identifier.

In a possible implementation, the file system module may convert the received access request, to obtain information about the first data, such as a file name of the first data and a storage path of the first data. Then, the first data identifier may be obtained based on the information about the first data that is obtained by the file system module through conversion.

In a possible implementation, the data reading module is specifically configured to: when the determining module determines that the first data is non-local data, obtain the first identifier of the first data based on the file name of the first data.

In a possible implementation, the data reading module specifically includes a searching module and a transceiver module.

The searching module is configured to: search, according to a first mapping relationship, for the second identifier corresponding to the first data, and determine, based on the second identifier, the second terminal that stores the first data.

The transceiver module is configured to: send a read request to the second terminal, and receive the first data sent by the second terminal based on the read request.

In this implementation of this application, the second identifier corresponding to the first data may be searched for according to the local mapping relationship, the read address of the first data is further determined based on the second identifier, and the first data stored in another device is received by using the transceiver module, to implement cross-terminal data reading.

In a possible implementation, a distributed storage system further includes a third terminal, and the data reading module specifically includes a transceiver module.

The transceiver module is configured to send the first identifier to the third terminal, to enable the third terminal to read the first data based on the first identifier. The first identifier is used to obtain the second identifier corresponding to the first data, the second identifier is associated with the content of the first data, and the first data is read from the second terminal by using the read address after the read address of the first data is determined based on the second identifier.

The transceiver module is further configured to receive the first data sent by the third terminal.

In this implementation of this application, the transceiver module may send the first identifier to the third terminal, to enable the third terminal to search for the corresponding second identifier based on the first identifier, determine the read address of the first data based on the second identifier, and read the first data from the second terminal based on the read address. Then, the transceiver module may receive the first data sent by the third terminal, to implement cross-terminal access on the first data.

In a possible implementation, the first identifier may be read based on the file name. For example, corresponding structure data may be read based on the file name of the first data, and the first identifier is read from the structure data. A specific manner of obtaining the first identifier is provided.

In a possible implementation, the first data identifier is an identifier used to identify whether the first data is local data, and the first data identifier is obtained based on the file name of the first data. Therefore, the determining module may directly determine, based on the first data identifier, whether the first data is local data. This can accurately identify whether the first data is local data.

In a possible implementation, the first data identifier is a variable obtained based on the file name of the first data. For example, the corresponding structure data may be read based on the file name corresponding to the first data, the variable used to identify whether the first data is stored locally is read from the structure data, and the variable is used as the first data identifier.

In a possible implementation, the file system module may convert the file name of the first data, to obtain the storage path information of the first data, and use the storage path information as the first data identifier. Therefore, whether the first data is local data can be directly determined based on the storage path information of the first data. This can efficiently and accurately identify whether the first data is local data.

In a possible implementation, the first data identifier may include information about an access frequency of the first data. When the access frequency is higher than a threshold, it is determined that the first data is local data. When the access frequency is not higher than a threshold, it is determined that the first data is non-local data.

In this implementation of this application, whether the first data is local data may be determined based on the access frequency of the first data, and data with an access frequency higher than the threshold is stored locally. This can further increase efficiency of accessing the first data again, and improve user experience.

In a possible implementation, the first data identifier includes information about a first process corresponding to the first data. The determining module is specifically configured to determine, based on the information about the first process and a second mapping relationship, whether the first data is local data. The second mapping relationship includes a mapping relationship between a process and a storage identifier, and the storage identifier is used to identify whether data of a corresponding process is stored locally.

In this implementation of this application, a mapping relationship may be set between a process and a storage location, and the storage location includes a local location or a non-local location. In this way, whether the first data is local data can be directly determined by using the process corresponding to the first data. This can flexibly and efficiently identify whether the first data is local data.

In a possible implementation, the second mapping relationship is obtained based on data input by a user. The mapping relationship between the process and the storage location may be set by the user, so that the user can select a location for storing data of the process. This can improve user experience.

In a possible implementation, the first data is data that is determined based on an input operation and that a user requests to access, or data that a process in the first terminal requests to invoke.

In this embodiment of this application, data may be read across terminals based on the input operation of the user, or data may be invoked based on a request of the process in the first terminal. This can implement data invoking in a plurality of cases.

According to a second aspect, this application provides a data reading method, applied to a distributed storage system. The distributed storage system includes a first terminal and a second terminal. The method includes: The first terminal obtains a first data identifier. The first terminal determines, based on the first data identifier, whether first data is local data, where the first data is to-be-read data. If the first terminal determines that the first data is non-local data, the first terminal obtains a first identifier of the first data. The first terminal obtains the first data based on the first identifier. The first identifier is used to obtain a second identifier corresponding to the first data, the second identifier is associated with content of the first data, the second identifier is used to obtain a read address of the first data, and the read address of the first data indicates to address the first data from the second terminal.

In this embodiment of this application, after obtaining the first data identifier, the first terminal may determine, based on the first data identifier, whether the first data is local data. If the first data is local data, the first data may be directly read from a local storage system. If the first data is non-local data, the first data may be read based on the first identifier. Therefore, the first terminal does not need to learn of a storage path of the first data, and may read the data based on the first identifier of the first data. The first identifier is used to obtain the second identifier, the second identifier is obtained based on the content of the first data, and the second identifier is associated with the content of the first data. Therefore, the first identifier may be used to search for the second identifier. After the second identifier is found, the first data can be read. This can implement cross-terminal data reading.

In a possible implementation, the method further includes: The first terminal receives an access request for the first data. That the first terminal obtains a first data identifier may include: The first terminal obtains the first data identifier based on the access request.

In this implementation of this application, the access request for the first data may be received, and the first data identifier is obtained based on the access request. A specific manner of obtaining the first data identifier is provided.

In a possible implementation, that the first terminal obtains the first data based on the first identifier may include: The first terminal searches, according to a first mapping relationship, for the second identifier corresponding to the first data. The first terminal determines, based on the second identifier, the second terminal that stores the first data, that is, the read address indicates the second terminal. The first terminal sends a read request to the second terminal, and receives the first data sent by the second terminal based on the read request.

In this implementation of this application, the second identifier corresponding to the first data may be searched for according to the first mapping relationship stored locally. The second identifier is generated based on the content of the first data, and the first data is stored based on the content.

Therefore, the first data can be addressed based on the second identifier. This can implement cross-terminal data reading.

In a possible implementation, the distributed storage system further includes a third terminal. That the first terminal obtains the first data based on the first identifier may include: The first terminal sends the first identifier to the third terminal, to enable the third terminal to read the first data based on the first identifier. The first identifier is used to obtain the second identifier corresponding to the first data, and the second identifier is associated with the content of the first data. The third terminal may determine the read address of the first data based on the second identifier, and read the first data from the second terminal based on the read address. The first terminal receives the first data sent by the third terminal.

In this implementation of this application, the first identifier may be directly sent to the third terminal, to enable the third terminal to search for the corresponding second identifier based on the first identifier, and read the first data based on the second identifier, so as to complete cross-terminal data reading.

In a possible implementation, the first data identifier is used to identify whether the first data is local data, and the first data identifier is obtained based on a file name of the first data.

Therefore, the first data identifier may be obtained based on the file name of the first data. A specific manner of obtaining the first data identifier is provided.

In a possible implementation, the first terminal may read corresponding structure data based on the file name of the first data, read, from the structure data, a variable used to identify whether the first data is stored locally, and use the variable as the first data identifier. A specific manner of obtaining the first data identifier based on the file name of the first data is provided.

In a possible implementation, that the first terminal obtains the first data identifier based on a file name of the first data may specifically include: The first terminal reads the storage path information of the first data based on the file name of the first data, and uses the storage path information as the first data identifier. Then, the first terminal may accurately determine, based on the storage path information of the first data, whether the first data is local data.

For example, a VFS in the first terminal may convert the file name of the first data, to obtain the storage path information of the first data, and use the storage path information as the first data identifier. Therefore, whether the first data is local data can be directly determined based on the storage path information of the first data. This can efficiently and accurately identify whether the first data is local data.

In a possible implementation, the first data identifier may include information about an access frequency of the first data. When the access frequency is higher than a threshold, the first terminal determines that the first data is local data. When the access frequency is not higher than a threshold, the first terminal determines that the first data is non-local data.

In this implementation of this application, a storage location of the first data may be determined based on the access frequency of the first data, the storage location includes a local location or a non-local location, and data with an access frequency higher than the threshold is stored locally. This can further increase efficiency of accessing the first data again, and improve user experience.

In a possible implementation, the first data identifier includes information about a first process corresponding to the first data, and that the first terminal determines, based on the first data identifier, whether the first data is local data may include: The first terminal determines, based on the information about the first process and a second mapping relationship, whether the first data is local data. The second mapping relationship includes a mapping relationship between the first process and a storage identifier, and the storage identifier is used to identify whether data of a process corresponding to the identifier is stored locally.

In this implementation of this application, a mapping relationship may be set between a process and a storage location, and the storage location includes a local location or a non-local location. In this way, whether the first data is stored locally can be directly determined by using the process corresponding to the first data. This can flexibly and efficiently identify whether the first data is local data. A specific implementation of determining whether the first data is local data is provided.

In a possible implementation, the second mapping relationship is obtained based on data input by a user.

In this implementation of this application, a storage location of data of a process may be selected by the user. This can improve user experience.

In a possible implementation, the first data is data that is determined based on an input operation and that a user requests to access, or data that a process in the first terminal requests to invoke. In this embodiment of this application, data may be read across terminals based on the input operation of the user, or data may be invoked based on a request of the process in the first terminal. This can implement data invoking in a plurality of cases.

According to a third aspect, this application provides a third terminal, applied to a distributed storage system. The distributed storage system includes the third terminal, and the third terminal includes:

an obtaining module, configured to obtain first data and a first identifier corresponding to the first data, where the first identifier is a unique identifier of the first data in the distributed storage system; and a management module, configured to: determine a storage address of the first data, and obtain a second identifier associated with content of the first data, where the storage address is used to store the first data; and add a mapping relationship between the first identifier and the second identifier to a first mapping relationship, where the first mapping relationship includes a mapping relationship between a unique identifier of stored data in the distributed storage system and an identifier associated with content of the stored data.

In this implementation of this application, after the to-be-stored first data and the first identifier of the first data are obtained, the storage address of the first data may be determined. The second identifier associated with the content of the first data is obtained, and the mapping relationship between the first identifier and the second identifier is added to the first mapping relationship. The first mapping relationship includes the mapping relationship between the identifier of the data and the identifier associated with the content of the data stored in the data. When the data is read subsequently, the second identifier may be searched for according to the first mapping relationship, and the first data is addressed based on the second identifier, to complete cross-terminal data storage and access.

In a possible implementation, the third terminal further includes a transceiver module.

The management module is specifically configured to determine, based on the content of the first data, a second terminal that stores the first data, that is, the storage address indicates the second terminal.

The transceiver module is configured to send a data storage request to the second terminal. The data storage request includes the first data, and the data storage request is used to request the second terminal to store the first data.

The transceiver module is further configured to receive a second identifier sent by the second terminal.

In this implementation of this application, after the second terminal that stores the first data is determined based on the content of the first data, the first data may be sent to the second terminal, so that the second terminal stores the first data, and the second identifier is generated based on the content of the first data, and fed back to the third terminal. This implements cross-terminal storage of the first data.

In a possible implementation, the obtaining module is specifically configured to receive the first data and the first identifier that are sent by a first terminal.

In this implementation of this application, the first data may be received data sent by the first terminal, and the first data is sent to the third terminal when the first terminal determines that the first data is stored non-locally. This implements cross-terminal storage of the first data.

In a possible implementation, the obtaining module is specifically configured to obtain the first data and generate the first identifier.

In this implementation of this application, when the third terminal has data that needs to be stored in another terminal, the first identifier of the first data may be generated. This can implement cross-terminal storage of the data of the third terminal.

In a possible implementation, the third terminal may further include a determining module.

The determining module is specifically configured to determine, based on information about a first process and a second mapping relationship, whether the first data is stored locally. The second mapping relationship includes a mapping relationship between a process and a storage identifier, and the storage identifier is used to identify whether data of a corresponding process is stored locally.

The obtaining module is specifically configured to: when the determining module determines that the first data is stored non-locally, generate the first identifier.

In this implementation of this application, whether the first data is stored locally may be determined based on the information about the first process of the first data. When it is determined that the first data is stored non-locally, the first identifier of the first data is generated, and the first data may be subsequently read based on the first identifier.

In a possible implementation, the second mapping relationship is obtained based on data input by a user.

In this implementation of this application, the second mapping relationship may be obtained based on the data input by the user, that is, the user may select a storage location of data corresponding to a process. This improves user experience.

In a possible implementation, the determining module may further be configured to determine, based on an access frequency of the first data, whether the first data is stored locally.

In this implementation of this application, a storage location of the first data may be determined based on the access frequency of the first data, the storage location includes a local location or a non-local location, and data with an access frequency higher than the threshold is stored locally. This can further increase efficiency of accessing the first data again, and improve user experience.

According to a fourth aspect, this application provides a data storage method, applied to a distributed storage system. The distributed storage system includes a third terminal, and the method includes:

The third terminal obtains first data and a first identifier corresponding to the first data, where the first identifier is a unique identifier of the first data in the distributed storage system; determines a storage address of the first data, and stores the first data based on the storage address; obtains a second identifier associated with content of the first data; and adds a mapping relationship between the first identifier and the second identifier to a first mapping relationship, where the first mapping relationship includes a mapping relationship between a unique identifier of stored data in the distributed storage system and an identifier associated with content of the stored data.

In this implementation of this application, after the to-be-stored first data and the first identifier of the first data are obtained, the storage address of the first data, namely, a terminal in which the first data is stored, may be determined. The second identifier associated with the content of the first data is obtained, and the mapping relationship between the first identifier and the second identifier is added to the first mapping relationship. The first mapping relationship includes the mapping relationship between the unique identifier of the data in the distributed storage system and the identifier associated with the content of the data. When the data is read subsequently, the second identifier may be searched for according to the first mapping relationship, and the first data is addressed based on the second identifier, to complete cross-terminal data storage and access.

In a possible implementation, the distributed storage system further includes a third terminal. The determining a storage address of the first data may include: determining, based on content of the first data, the third terminal that stores the first data. The method may further include: sending a data storage request to the third terminal, where the data storage request includes the first data, and the data storage request is used to request the third terminal to store the first data.

In this implementation of this application, after the third terminal that stores the first data is determined based on the content of the first data, the first data may be sent to the third terminal, so that the third terminal stores the first data, and the second identifier is generated based on the content of the first data, and fed back to the third terminal. This implements cross-terminal storage of the first data.

In a possible implementation, the obtaining first data and a first identifier corresponding to the first data may include: receiving the first data and the first identifier that are sent by a first terminal.

In this implementation of this application, the first data may be received data sent by the first terminal, and the first data is sent to the third terminal when the first terminal determines that the first data is stored non-locally. This implements cross-terminal storage of the first data.

In a possible implementation, the obtaining a first identifier corresponding to the first data may include: generating the first identifier corresponding to the first data.

In this implementation of this application, when the third terminal has data that needs to be stored in another terminal, the first identifier of the first data may be generated. This can implement cross-terminal storage of the data of the third terminal.

In a possible implementation, the method may further include: obtaining a third identifier based on information about a first process and a second mapping relationship, where the second mapping relationship includes a mapping relationship between a process and a storage identifier, and the storage identifier is used to identify whether data of a corresponding process is stored locally; and determining, based on the third identifier, whether the first data is stored locally. The generating the first identifier corresponding to the first data may include: if it is determined, based on the third identifier, that the first data is stored non-locally, generating the first identifier corresponding to the first data.

In this implementation of this application, whether the first data is stored locally may be determined based on the information about the first process of the first data. When it is determined that the first data is stored non-locally, the first identifier of the first data is generated, and the first data may be subsequently read based on the first identifier.

In a possible implementation, the second mapping relationship is obtained based on data input by a user.

In this implementation of this application, the second mapping relationship may be obtained based on the data input by the user, that is, the user may select a storage location of data corresponding to a process. This improves user experience.

In a possible implementation, whether the first data is stored locally may further be determined, based on an access frequency of the first data.

In this implementation of this application, a storage location of the first data may be determined based on the access frequency of the first data, the storage location includes a local location or a non-local location, and data with an access frequency higher than the threshold is stored locally. This can further increase efficiency of accessing the first data again, and improve user experience.

According to a fifth aspect, this application provides a first terminal, including:

a processor, a memory, a bus, and an input/output interface, where the processor, the memory, and the input/output interface are connected to each other by using the bus, the memory is configured to store program code, and when invoking the program code in the memory, the processor performs the method in the second aspect or any implementation of the second aspect of this application.

According to a sixth aspect, this application provides a third terminal, including:

a processor, a memory, a bus, and an input/output interface, where the processor, the memory, and the input/output interface are connected to each other by using the bus, the memory is configured to store program code, and when invoking the program code in the memory, the processor performs the method in the fourth aspect or any implementation of the fourth aspect of this application.

According to a seventh aspect, this application provides a chip system. The chip system includes a processor, configured to support a server or a terminal device in implementing functions in the foregoing aspects, for example, processing data and/or information in the foregoing method. In a possible design, the chip system further includes a memory. The memory is configured to store program instructions and data that are necessary for a network device. The chip system may include a chip, or may include a chip and another discrete component.

The processor mentioned in any one of the foregoing aspects may be a general-purpose central processing unit (CPU), a microprocessor, an application-specific integrated circuit (application-specific integrated circuit, ASIC), or one or more integrated circuits configured to control program execution corresponding to steps in any method in the second aspect or the fourth aspect.

According to an eighth aspect, this application provides a storage medium. It should be noted that technical solutions of this application essentially, or a part contributing to a current technology, or all or a part of the technical solutions may be implemented in a form of a software product. The computer software product is stored in the storage medium, and is configured to store computer software instructions used by the foregoing device. The computer software instructions include programs designed for executing any method in the second aspect or the fourth aspect.

The storage medium includes various media that may store program code, such as a USB flash drive, a removable hard disk, a read-only memory (ROM for short, English full name: Read-Only Memory), a random access memory (RAM for short, English full name: Random Access Memory), a magnetic disk, or an optical disc.

According to a ninth aspect, this application provides a computer program product including instructions. When the computer program product runs on a computer, the computer is enabled to perform the method in any one of the optional implementations of the second aspect or the fourth aspect of this application.

According to a tenth aspect, this application provides an apparatus. The apparatus may be applied to an electronic device, is coupled to a memory, and is configured to read and execute instructions stored in the memory, to enable the apparatus to implement steps in any one of the implementations of the second aspect or the fourth aspect of this application. In a possible design, the apparatus is a chip or a system-on-chip.

In the possible implementations, the second identifier is an identifier generated based on the content of the first data.

In the possible implementations, the second identifier may be a hash ID.

DESCRIPTION OF EMBODIMENTS

The following describes technical solutions in embodiments of this application with reference to accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

Figure 1A:
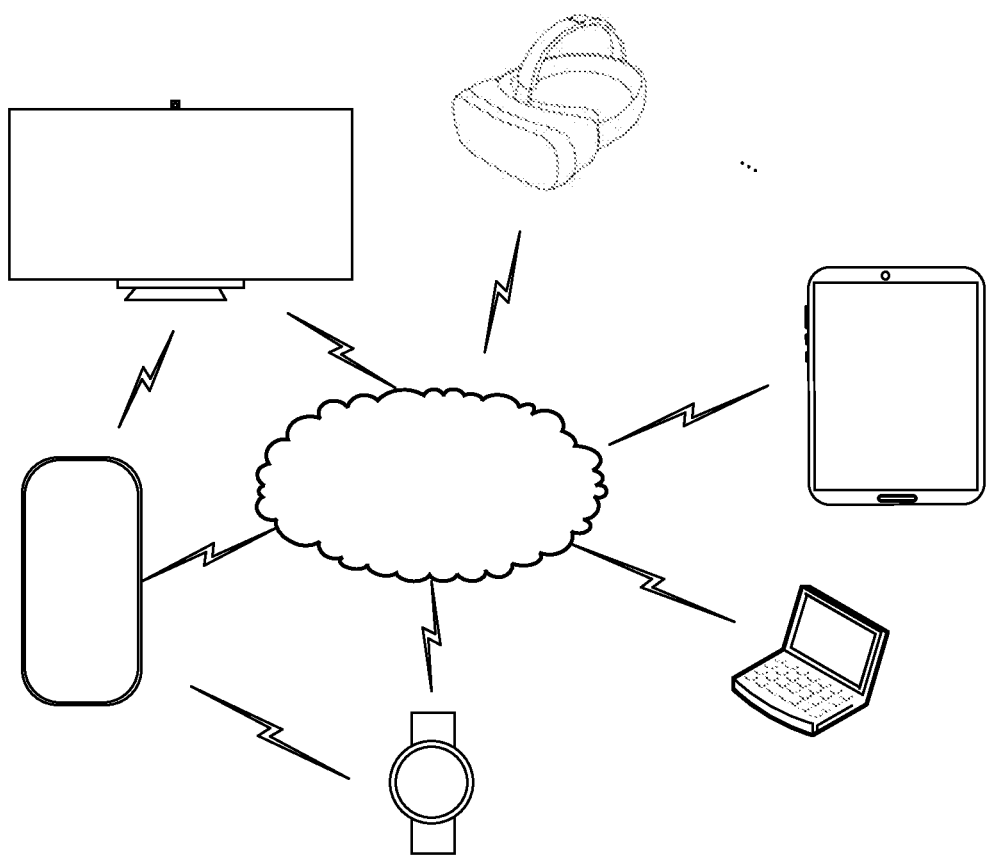
FIG. 1A is a schematic diagram of a network architecture according to an embodiment of this application.

First, for a network architecture of an application of a data reading method and a data storage method provided in this application, refer to FIG. 1A. The network architecture includes a plurality of terminals, and the terminals may be connected to each other.

The terminal in this application may include but is not limited to: a smart mobile phone, a television, a tablet computer, a band, a head-mounted display (Head-mounted Display, HMD), an augmented reality (augmented reality, AR) device, a mixed reality (mixed reality, MR) device, a cellular phone (cellular phone), a smartphone (smartphone), a personal digital assistant (personal digital assistant, PDA), a tablet computer, a vehicle-mounted terminal, a laptop computer (laptop computer), a personal computer (personal computer, PC), or the like. It is clear that a specific form of the terminal is not limited in embodiments of this application.

The plurality of terminals may establish connections by using a wireless network or a wired network. The wireless network includes but is not limited to any one or any combination of a 5th generation (5th Generation, 5G) mobile communication technology system, a long term evolution (long term evolution, LTE) system, a global system for mobile communication (global system for mobile communication, GSM), a code division multiple access (code division multiple access, CDMA) network, a wideband code division multiple access (wideband code division multiple access, WCDMA) network, wireless fidelity (wireless fidelity, Wi-Fi), Bluetooth (Bluetooth), ZigBee (ZigBee), a radio frequency identification (Radio Frequency Identification, RFID) technology, long range (Long Range, Lora) wireless communication, and near field communication (near field communication, NFC).

The network architecture shown in FIG. 1A may be understood as a distributed storage system provided in this application. In this application, the distributed storage system is established based on storage of the plurality of terminals, and a point-to-point storage system and a content-based addressing storage system can be implemented. In other words, one terminal may store data on another terminal based on content, and may read the data stored in the another terminal.

A system that may be installed on the terminal may include iOS®, Android®, Microsoft®, Linux®, HarmonyOS, or another operating system. This is not limited in this embodiment of this application.

Figure 1B:
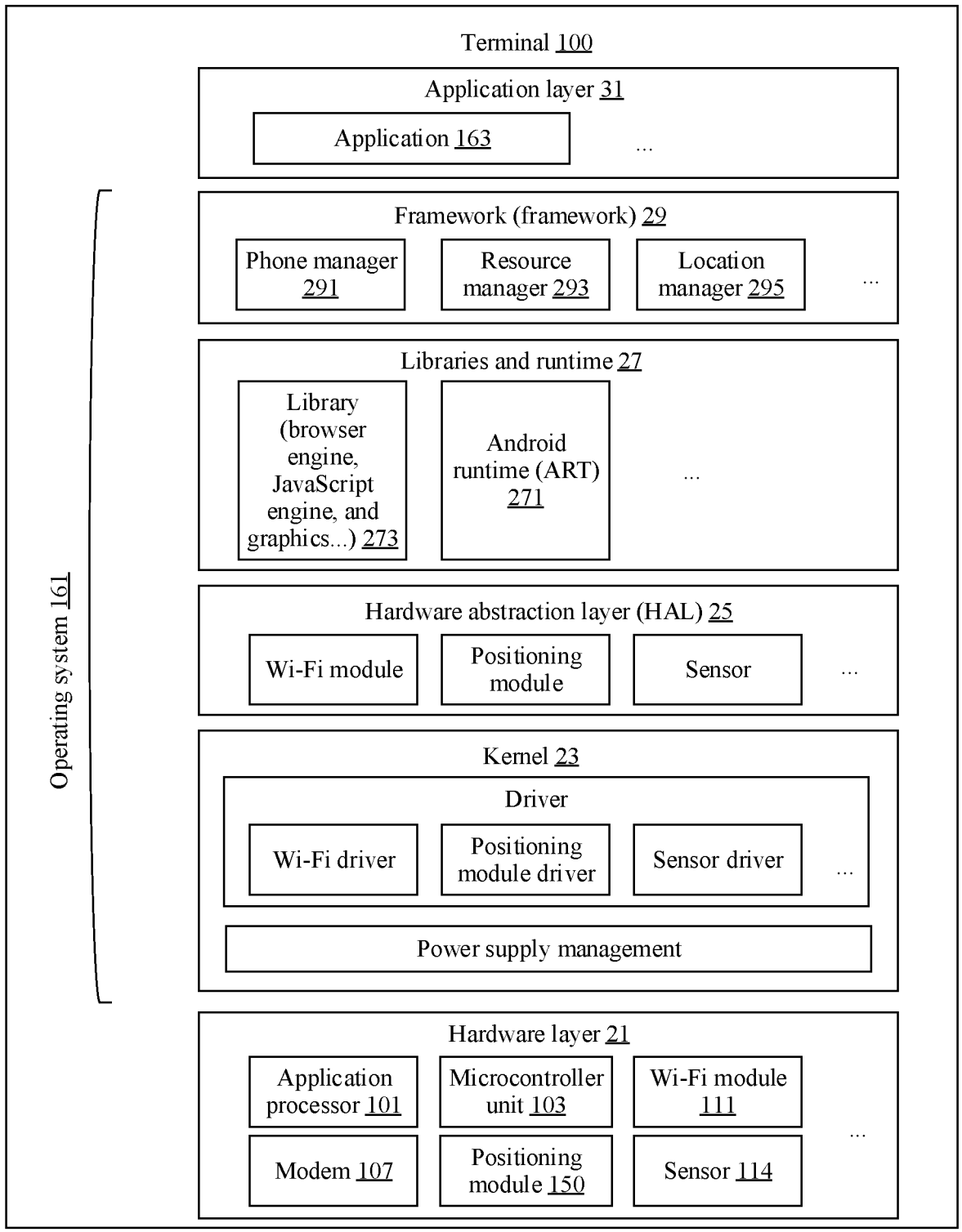
FIG. 1B is a schematic diagram of a structure of a terminal according to this application.

A terminal 100 installing the Android® operating system is used as an example. As shown in FIG. 1B, the terminal 100 may be logically divided into a hardware layer 21, an operating system 161, and an application layer 31. The hardware layer 21 includes hardware resources such as an application processor 101, a microcontroller unit 103, a modem 107, a Wi-Fi module 111, a sensor 114, and a positioning module 150. The application layer 31 includes one or more applications, for example, an application 163. The application 163 may be any type of application, for example, a social application, an e-commerce application, or a browser. The operating system 161 is used as software middleware between the hardware layer 21 and the application layer 31, and is a computer program for managing and controlling hardware and software resources.

In an embodiment, the operating system 161 includes a kernel 23, a hardware abstraction layer (hardware abstraction layer, HAL) 25, libraries and runtime (libraries and runtime) 27, and a framework (framework) 29. The kernel 23 is configured to provide an underlying system component and a service, for example, power management, memory management, thread management, or a hardware driver. The hardware driver includes a Wi-Fi driver, a sensor driver, a positioning module driver, or the like. The hardware abstraction layer 25 encapsulates a kernel driver, provides an interface for the framework 29, and shields implementation details of a lower layer. The hardware abstraction layer 25 runs in user space, and the kernel driver runs in kernel space.

The libraries and runtime 27 is also referred to as a runtime library, and provides a required library file and execution environment when an executable program is run. The libraries and the runtime 27 includes an Android runtime (Android Runtime, ART) 271, a library 273, and the like. The ART 271 is a virtual machine or virtual machine instance that can convert bytecode of the application into machine code. The library 273 is a program library that provides support for the executable program during running, and includes a browser engine (for example, Webkit), a script execution engine (for example, a JavaScript engine), a graphics processing engine, and the like.

The framework 27 is configured to provide various basic common components and services, such as window management and location management, for an application at the application layer 31. The framework 27 may include a phone manager 291, a resource manager 293, a location manager 295, and the like.

All functions of components in the operating system 161 described above may be implemented by the application processor 101 by executing programs stored in a memory 105.

A person skilled in the art may understand that the terminal 100 may include fewer or more components than those shown in FIG. 1B. The terminal shown in FIG. 1A includes only components more related to a plurality of implementations disclosed in this embodiment of this application.

It can be seen from FIG. 1B that a plurality of applications may be installed on the terminal. Therefore, data required by the terminal includes data used by an application and data used for system running.

Figure 1C:
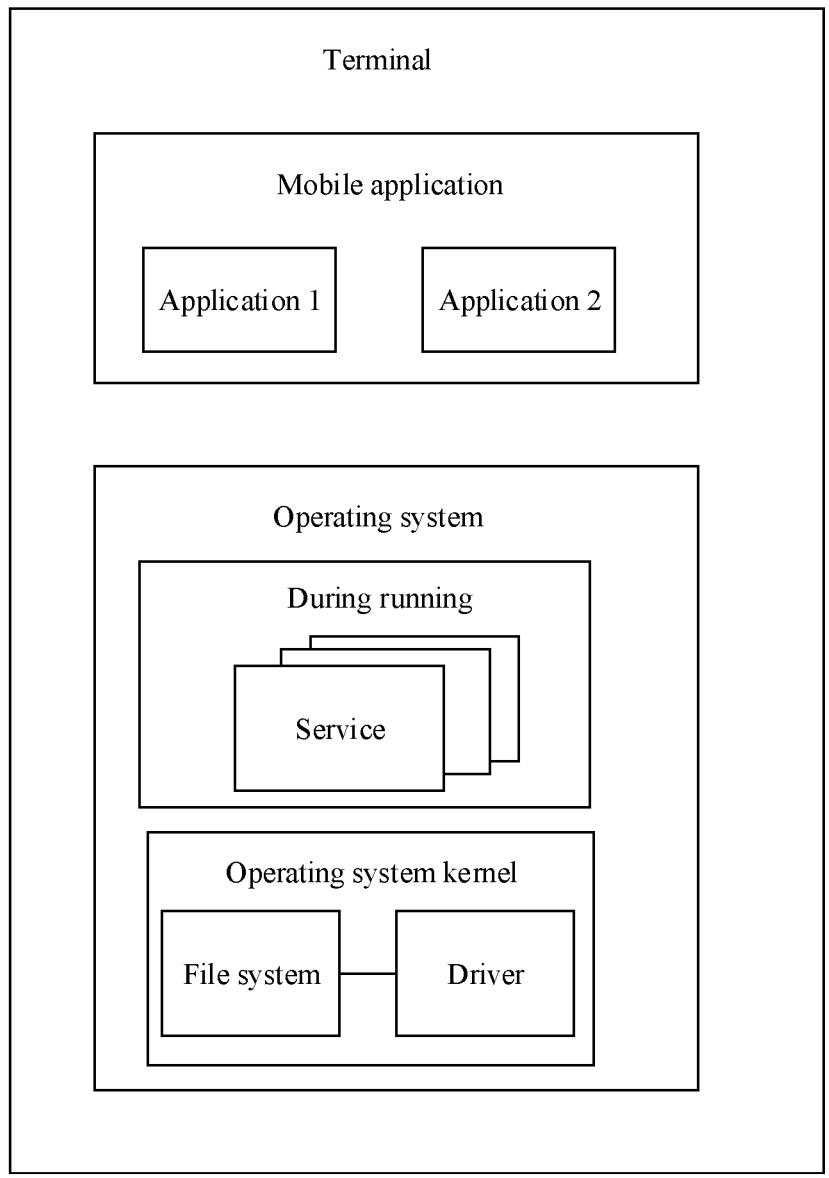
FIG. 1C is a schematic diagram of a structure of another terminal according to this application.

Based on FIG. 1B, FIG. 1C shows a more simplified structure. The terminal may include one or more installed applications (for example, an application 1 or an application 2 shown in FIG. 1C), a runtime in an operating system includes a plurality of services (service) of the system, and a kernel of the operating system includes a file system and a driver.

A single terminal device includes an operating system and a mobile application running on the operating system. The Android, HarmonyOS, and iOS are mainstream terminal operating systems. The application invokes, by invoking the service (Service) of the operating system, hardware resources of the terminal, for example, a computing resource, a storage resource, and a sensor resource, and interacts with another application. The operating system usually includes a runtime environment and an operating system kernel. For example, a runtime environment of the Android operating system includes an application framework layer and a system runtime library layer. The operating system kernel mainly manages resources, such as file management and driver management. The operating system kernel of the terminal provided in this application further includes the file system, used to read data across terminals.

According to the data reading method and the data storage method provided in this application, data sharing between terminals can be implemented, so that the terminals can access data of each other, including data of an application and data used for system running. With reference to the foregoing network architecture and the structure of the terminal, the following separately describes the data reading method and the data storage method provided in this application.

Figure 2:
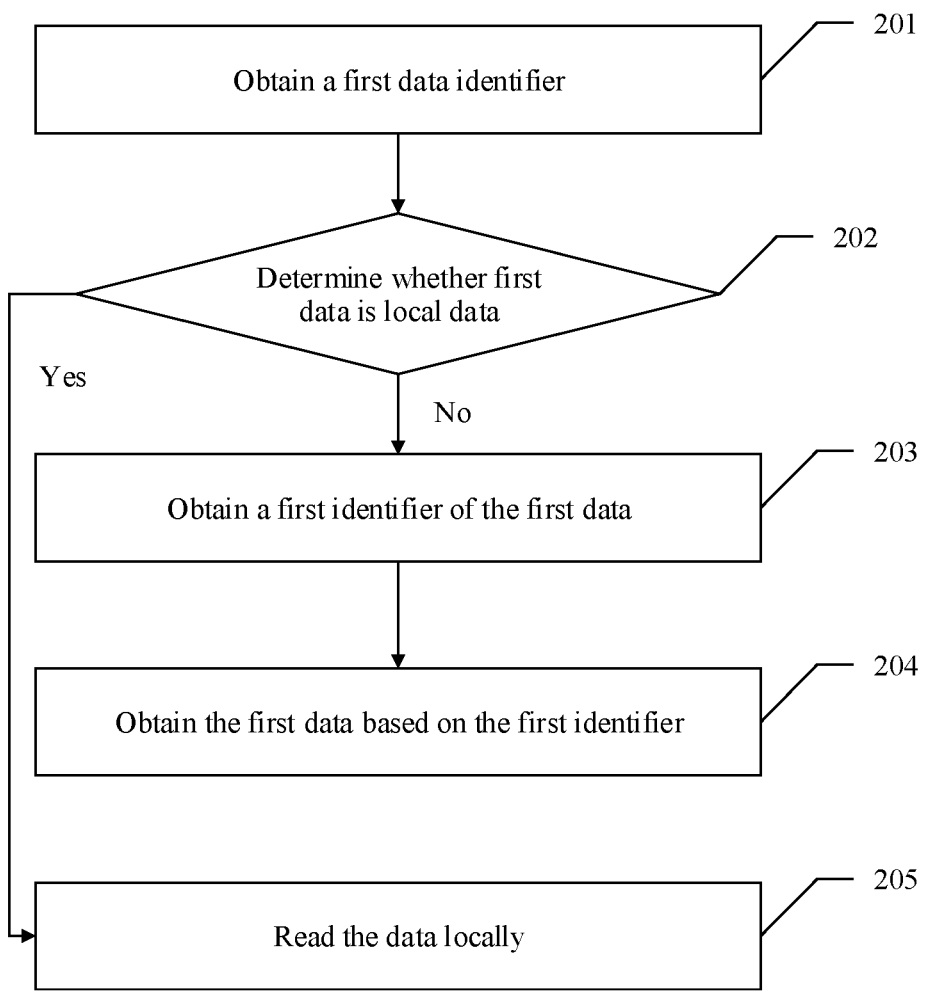
FIG. 2 is a schematic flowchart of a data reading method according to this application.

First, refer to FIG. 2. FIG. 2 is a schematic flowchart of a data reading method according to this application.

It should be noted that the data reading method provided in this application may be performed by a first terminal, and the first terminal may be any one of the plurality of terminals in the foregoing distributed storage system.

201: Obtain a first data identifier.

The first data identifier includes information about first data, and the first data is data that the first terminal needs to read.

Specifically, the first data identifier may include but is not limited to one or more of the following: an identifier used to identify whether the first data is local data, storage path information of the first data, information about a first process, and the like.

In a possible implementation, before step 201, the method may further include: obtaining an access request for the first data, where the access request is used to request to access the first data. The access request may be generated by the first terminal based on an input operation of a user, or may be generated when a process of the first terminal runs, or may be generated when a system of the first terminal runs. For example, when the user taps video data displayed on a terminal, the terminal generates, based on input data of the user, an access request for requesting to access the video data. For another example, when a process of a terminal runs, and video data needs to be invoked, the terminal generates an access request for the video data.

Correspondingly, the first data may be data that is determined based on the input operation and that the user requests to access, or the first data may be data that the process of the first terminal requests to invoke, or the first data may be data that is invoked when the system of the first terminal runs.

For example, when the user needs to play a video by using the first terminal, the user may tap a thumbnail of the video on a display of the terminal. The terminal determines, based on a tap operation of the user, video data that the user requests to access. The video data may be understood as data that is determined based on the input operation and that the user requests to access. For another example, when the terminal runs, if a process of the terminal needs to invoke a library file, the library file may be understood as data that the process of the terminal requests to invoke.

For another example, in a procedure of starting or running an application of the terminal, the application needs to access data stored in another terminal. For example, when the application is started, the application may read an installation file, and load a library file, and the like. Alternatively, in a procedure of running an application, the application needs to read data, for example, a photographed photo or video, or a temporary file downloaded from a network. The terminal may generate an access request used to request to access data such as a photo, a video, or a temporary file downloaded from a network.

For another example, the data invoked when the system runs may include, for example, a library file of the Android system and data of a manager (Manager) in a framework. Typical library files such as Libc, a Webkit library, and an OpenGL graphics library of the Android system are usually stored in a local storage system in a file form. Specifically, the manager of the framework in the Android system includes a phone manager, a resource manager, a location manager, and the like. As system processes of the Android system, the managers may also invoke some related files. For example, the phone manager may invoke a local address book file.

Further, the first data identifier may be obtained by using the access request for the first data. Specifically, the first data identifier may be data obtained based on the access request. For example, the access request carries a file name of the first data. A VFS in the first terminal may convert the file name of the first data into the storage path information, and use the storage path information as the first data identifier. For another example, the access request carries a file name of the first data, structure data may be searched for based on the file name, and the identifier used to identify whether the first data is local data is obtained from the structure data, to obtain the first data identifier.

In a possible implementation, before step 201, the method may further include: storing the first data across terminals. For a specific manner of storing the first data across terminals, refer to related descriptions in FIG. 16 to FIG. 18. Details are not described herein again.

202: Determine whether the first data is local data; and if the first data is local data, perform step 205; or if the first data is not local data, perform step 203.

After the first data identifier is obtained, whether the first data is local data is determined based on the first data identifier. If the first data is local data, perform step 205; or if the first data is non-local data, perform step 203.

In this embodiment of this application, a plurality of manners to determine, based on the first data identifier, whether the first data is local data include but are not limited to any one or a combination of the following implementations.

Implementation 1

The first data identifier is an identifier used to directly identify whether the first data is local data. Specifically, the first data identifier may be a variable used to identify whether the first data is local data. The structure data of the first data may be read based on the file name of the first data, and the variable is read from the structure data, to obtain the first data identifier. The first terminal may directly determine, based on the variable, whether the first data is local data.

For example, when the first data is stored locally or across terminals, one variable may be added to the structure data such as inode data corresponding to the first data. The structure data corresponding to the first data is structure data of a file corresponding to the first data. The variable indicates whether the first data is stored locally in the first terminal. When reading the first data, the first terminal may read the locally stored structure data corresponding to the first data, that is, obtain the variable, and determine, based on the variable, whether the first data is stored locally. Specifically, for example, after reading the first data for the first time, the first terminal locally caches the first data, and rewrite the variable is remote to 1 in the inode corresponding to the first data. It indicates that the first data has been read, and the first data has been stored locally. When reading the first data again, the first terminal may directly read the identifier is_remote. If is_remote=1, it is determined that the first data is local data. If is remote=0, it may be determined that the first data is non-local data. Alternatively, whether the first data is local data continues to be determined in another manner.

In this implementation, whether the first data is local data may be directly identified by using the variable in the structure data. Therefore, whether the first data is local data can be directly determined by reading the variable in the structure data of the first data. This can efficiently determine whether the first data is local data.

Implementation 2

The first data identifier includes the storage path information, and the storage path information is obtained through conversion based on the file name of the first data. Specifically, the storage path information of the first data may be extracted based on the file name of the first data, the storage path information of the first data is used as the first data identifier, and whether the first data is local data is determined based on the storage path information of the first data. When a path included in the storage path information of the first data is a local path, it is determined that the first data is local data. When the path included in the storage path information of the first data is a non-local path, it is determined that the first data is non-local data.

For example, if the first data is local data, the VFS of the first terminal may directly extract the path information of the first data from the file name, to obtain the first data identifier. A determining module may read the path information of the first data based on the first data identifier. For example, if the file name of the first data is abc.lic, the VFS searches a corresponding installation file, extracts a storage path /data/lic/abc.lic of the first data, and uses the storage path as the first data identifier. If an address corresponding to the path is local, it may be directly determined that the first data is local data based on the path information. If the path is non-local, it is determined that the first data is non-local data.

Specifically, for example, first, all files in /sdcard/youku and a subpath of /sdcard/youku are stored non-locally, and all files in /sdcard/system and a subpath of /sdcard/system are stored locally. For example, if youku is used to play a video, a file accessed by youku is offlinedata/movie1.mp4, where movie1.mp4 is a file name, and offlinedata is path information relative to youku. An installation path of youku in a system is /sdcard/youku/. If the file name is movie1.mp4, the storage path information is /sdcard/youku/offlinedata/movie1.mp4 (which is used as the first data identifier). If all files in /sdcard/youku and the subpath of /sdcard/youku are stored non-locally, it may be determined that data corresponding to the storage path information /sdcard/youku/offlinedata/movie1.mp4 is non-local data.

In this implementation, the storage path information of the first data may be used as the first data identifier, and a storage location of the first data may be directly determined. This can simply and effectively determine whether the first data is local data.

Implementation 3

The first data identifier may be information about a first process corresponding to the first data. The information may specifically include a process identifier, a process name, or the like of the first process. The first terminal may determine, based on the information about the first process and a second mapping relationship, whether the first data is local data. The second mapping relationship includes a mapping relationship between the process of the first terminal and a storage identifier, and the storage identifier indicates whether the data is stored locally. The second mapping relationship may specifically be a mapping relationship between the process name and the storage identifier in the first terminal; or the second mapping relationship may include a mapping relationship between the process identifier of the process of the first terminal and the storage identifier. The first terminal may obtain the process identifier or the process name of the first process, and then determine, in the second mapping relationship, whether data corresponding to the process identifier or the process name is stored locally.

For example, the following describes a specific manner of obtaining the process identifier. The Android system is used as an example. A Linux kernel is used at a bottom layer of the Android system, and provides a global function getpid( ), and the function directly returns pid of a current process. In the Linux kernel, a structure Task_struct of a Linux process maintains current process identifier information pid, and the current process identifier pid can be returned by directly invoking current->pid, where current is a global variable that indicates the structure Task_struct of the current process. A method of obtaining a process name is similar to that of obtaining a process identifier (for example, obtaining a process identifier by using a global function getCurProcessName).

In addition, the first process may be a process for storing the first data. The first process may be the same as or different from a process for requesting to invoke the first data. For example, if the first data is data that Weibo requests to store, a process that requests to invoke the first data may be a process of an application such as WeChat or QQ.

Figure 4A:
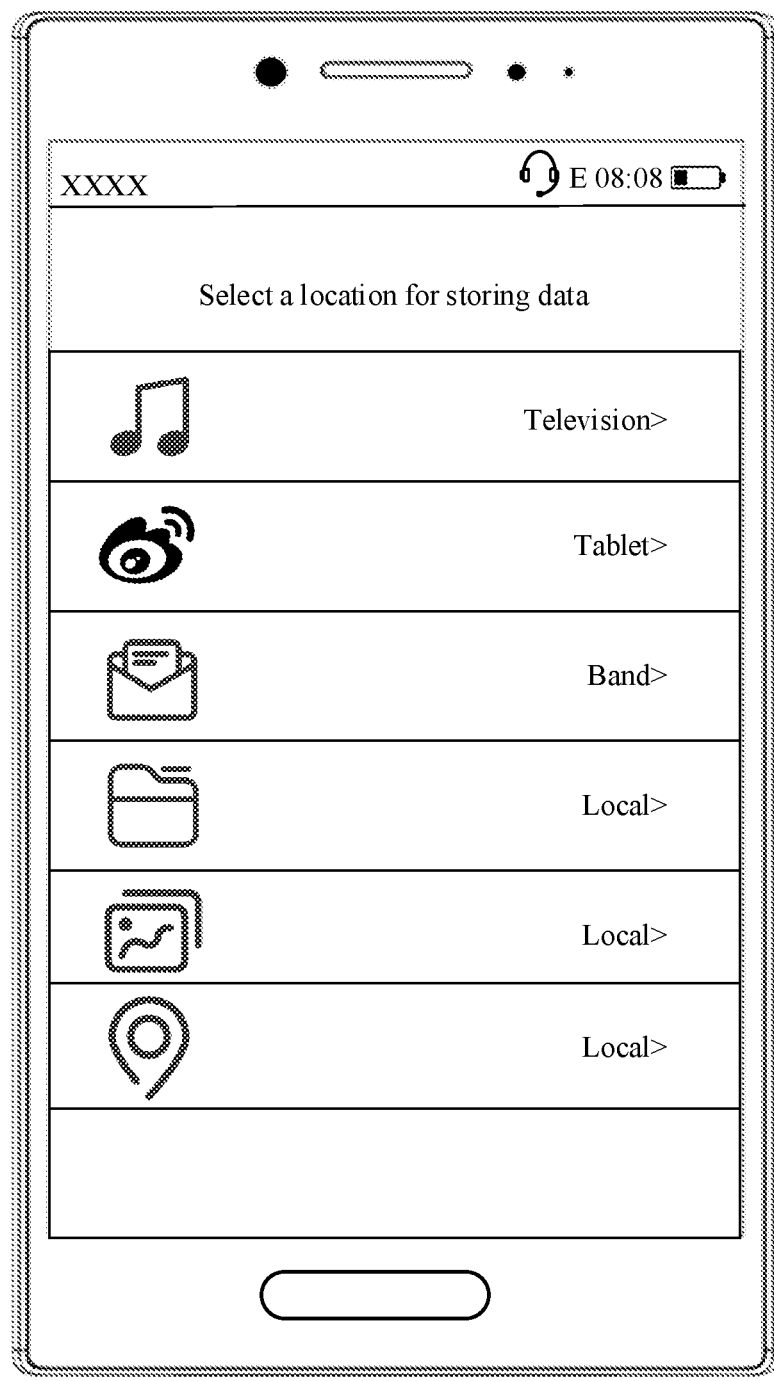
FIG. 4A is a schematic diagram of a storage location setting interface according to an embodiment of this application.
Figure 4B:
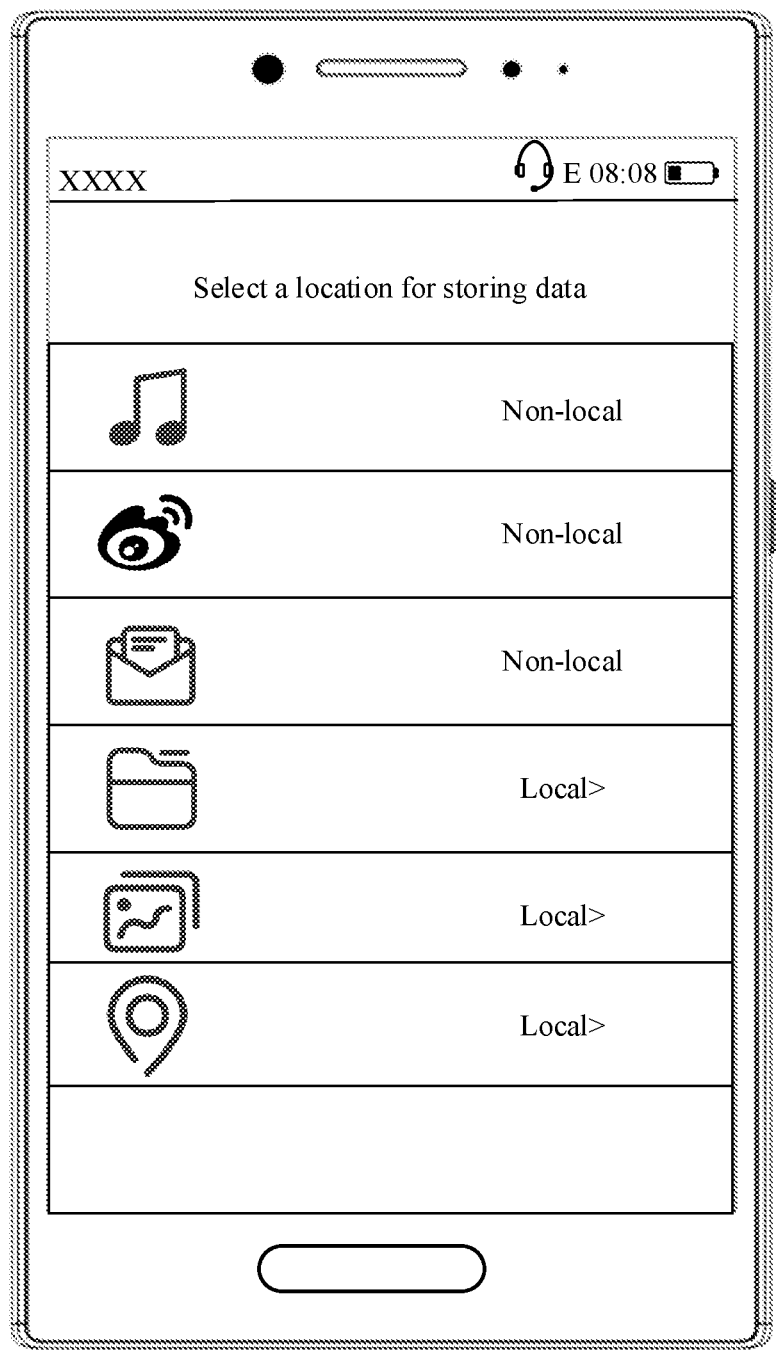
FIG. 4B is a schematic diagram of another storage location setting interface according to an embodiment of this application.

In a possible implementation, before step 202, the first terminal may further obtain the input data, and obtain the second mapping relationship based on the input data. For example, as shown in FIG. 4A, an application and a location in which the application can be stored may be displayed on a display interface of the first terminal. Then, the user selects, by using the input operation, a location in which data of each application is stored. Then, the first terminal generates a mapping relationship between a process name of the application and a storage location based on the input operation of the user. The storage location may include a local location or a non-local location. Alternatively, as shown in FIG. 4B, the user selects, by using the input operation, whether the data of each application is stored locally or non-locally. It is clear that the first terminal may alternatively directly allocate a default storage location to data corresponding to each application, that is, store the data locally or non-locally, and generate a mapping relationship between a process name of the application and the storage location. When the first terminal obtains an access request for data, the VFS of the first terminal may read a process identifier of a corresponding process, recursively read a parent process identifier of the corresponding process, and compare the parent process identifier with a process identifier of an application configured in the second mapping relationship, until it is recursively found that a matched parent process identifier exists in the second mapping relationship. Therefore, a storage location of the application corresponding to the process identifier is determined, and whether data of the application is local data is determined.

For example, this is shown in Table 1.

TABLE 1

| Process name | Storage identifier |
|---|---|
| weibo | 1 |
| wechat | 0 |
| image | 1 |
| ... | ... |
| message | 0 |

The storage identifier is used to identify whether data of a process corresponding to a process name is stored locally. Refer to FIG. 4A or FIG. 4B. The user may select whether data of a process is stored locally. A value of a storage identifier corresponding to each process of the first terminal is determined based on the input operation of the user. For example, when the value of the storage identifier is 0, it indicates that the data of the process corresponding to the process name is stored locally. When the value of the storage identifier is 1, it indicates that the data of the process corresponding to the process name is stored non-locally. In Table 1, if the process name of the process for storing the first data is weibo, a value of a corresponding storage identifier is 1, and it indicates that data of the weibo process is stored non-locally. When the process name of the process for storing the first data is weixin, a value of a corresponding storage identifier is 0, and it indicates that data of the weixin process is stored locally. This rule also applies to other cases.

Therefore, in this implementation, the user may select a storage location of data of a process. This can improve user experience.

In a possible implementation, the storage location of the data of the application in the first terminal may be determined by using the input data of the user, where the storage location includes a local location or a non-local location. Then, a mapping table including the process name and the storage location is generated based on the input data. When the application is started, one or more process identifiers corresponding to the application are obtained, and then the process name in the mapping table is updated to the process identifier and the corresponding storage identifier, to obtain the second mapping relationship.

For example, step 202 may be performed by the VFS of the first terminal. The VFS of the first terminal may determine whether the first data is local data. Before step 202, the VFS may set different attributes for the data based on the storage location of the data, for example, identify, in an inode attribute of the file, whether the data is stored locally. If the data is stored locally, a local storage system (for example, a file system such as EXT4 or F2FS in an existing system) may be directly invoked to directly obtain the local data, that is, step 205 is performed. If the first data is non-local data, step 203 may continue to be performed. For example, an identifier is_remote is added to an inode structure of the first data. When is_remote=0, it indicates that the first data is stored locally. When is_remote=1, it indicates that the first data is non-local data.

Implementation 4

The first data identifier may be a file name of the first data. The first terminal may obtain an access frequency of the first data based on the file name, and determine, based on the access frequency of the first data, whether the first data is stored locally or non-locally. Specifically, the first terminal may collect a quantity of times of accessing the first data in specific duration, and record a quantity of times of accessing data corresponding to each file name in the first terminal. Therefore, the quantity of times of accessing the first data in the specific duration may be determined based on the quantity of access times corresponding to the file name of the first data, to determine the access frequency of the first data. If the access frequency of the first data is higher than a threshold, the first terminal may determine that the first data is stored locally. If the access frequency of the first data is not higher than a threshold, the first terminal may determine that the first data is non-local data. For example, if the first data is video data, a quantity of times of accessing the video data may be obtained first. If the quantity of times of accessing the video data in specific duration is greater than five, it is determined that the video data is local data. If the quantity of times of accessing the data in specific duration is not greater than five, it may be determined that the video data is non-local data, or whether the video data is local data continues to be determined in another manner.

Therefore, in this implementation, data that is frequently accessed may be stored locally. This can increase reading efficiency of data that is frequently accessed. Data that is not frequently accessed may be stored across terminals, that is, stored in another device. This can improve storage utilization in the distributed storage system.

203: Obtain a first identifier of the first data.

After determining that the first data is non-local data, the first terminal may obtain the first identifier of the first data based on the file name of the first data.

The data, stored across terminals, of the first terminal has a unique identifier in the distributed storage system, or each piece of data or each group of data in the distributed storage system in which the first terminal is located has a unique identifier.

Specifically, corresponding structure data may be read based on the file name of the first data, the first identifier is read from the structure data, and the file name may be obtained from the received access request. For example, after it is determined that the first data is non-local data, the inode data corresponding to the first data is searched for by using the file name corresponding to the first data, and file_uuid is read from the inode data, to obtain the first identifier.

Usually, there are a plurality of manners of generating the first identifier. A manner of generating the first identifier is not limited in this application, provided that the generated first identifier is a unique identifier in the distributed storage system. For example, the first identifier may be combined by an ID of the first terminal, the file name, the process identifier or the process name for storing the first data, and a number allocated to the first data, to obtain the unique identifier of the first data in the distributed storage system.

For another example, the first terminal locally stores a mapping relationship between the file name of the data and the unique identifier. After obtaining the file name corresponding to the first data, the first terminal may search, according to the mapping relationship, for the first identifier of the first data corresponding to the file name.

204: Obtain the first data based on the first identifier.

After obtaining the identifier of the first data, the first terminal may obtain the first data based on the first identifier.

Specifically, the first identifier is used to obtain a second identifier corresponding to the first data, the second identifier is associated with content of the first data, the second identifier is used to obtain a read address of the first data, and the read address of the first data is used to address the first data from a second terminal.

It should be noted that the second identifier is an identifier associated with the content of the first data, and may be obtained based on the content of the first data. The second identifier may be generated in a plurality of manners, and may specifically be generated according to a hash algorithm, for example, a message-digest algorithm (message-digest algorithm, MD4), an MD5, or a secure hash algorithm (secure Hash algorithm, SHA). For ease of understanding, the following implementations of this application are described by using an example in which the second identifier is a hash ID. To be specific, the hash ID described in the following is one of second identifiers. Details are not described again.

In an implementation, if the first terminal stores the first mapping relationship, the first terminal may directly search, based on the first identifier, the locally stored first mapping relationship for the hash ID corresponding to the first identifier. The hash ID is associated with the content of the first data, and the first data is stored based on the content. Therefore, the second terminal that stores the first data may be determined based on the hash ID. The first terminal may send a read request to the second terminal, and receive the first data sent by the second terminal based on the read request.

In another implementation, if the first terminal does not locally store the first mapping relationship, but the first mapping relationship is stored in a third terminal, the first terminal may send the first identifier to the third terminal, so that the third terminal searches, based on the first identifier, the first mapping relationship for the corresponding hash ID. Then, the read address of the first data is searched for based on the hash ID, where the read address indicates the second terminal. The third terminal reads the first data from the second terminal based on the read address, and feeds back the first data to the first terminal. The third terminal and the second terminal may be a same terminal, or may be different terminals. When the third terminal and the second terminal are a same terminal, the third terminal may directly read the first data locally, and feed back the first data to the first terminal. When the third terminal and the second terminal are different terminals, the third terminal may send the read request to the second terminal, receive the first data sent by the second terminal, and send the first data to the first terminal. For example, in this application, one of a plurality of terminals may be determined as the third terminal based on the network architecture provided in FIG. 1A. The third terminal is configured to maintain the first mapping relationship, specifically including establishing or updating the first mapping relationship. After receiving the first identifier of the first data sent by the first terminal, the second terminal searches for the corresponding hash ID according to the first mapping relationship. The hash ID is an identifier generated based on the content of the data. The third terminal may determine, based on the hash ID, a terminal that stores the data, send the read request to the terminal, read the first data fed back by the terminal, and send the first data to the first terminal.

In a specific implementation, the read address may be an address that indicates the second terminal; or the read address may include an address that indicates the second terminal and a specific storage address of the first data in the second terminal. For example, the first terminal may perform a hash operation on the hash ID, and output a read address, where the read address may indicate only the second terminal, or may indicate a logical block address in the second terminal.

Specifically, a manner of obtaining the read address may be: using the hash ID as an input of the hash operation, and outputting a corresponding address, to obtain the read address. For example, the hash operation may be a message-digest algorithm (message-digest algorithm, MD4), an MD5, or a secure hash algorithm (secure Hash algorithm, SHA). The hash operation may be understood as an operation from a sequence to another sequence. A sequence with a fixed length, namely, the read address, may be output by using the hash ID as an input of the hash operation. For example, if the hash ID is "123456", a read address 007 is obtained after the hash operation, and 007 indicates a seventh node in the distributed storage system. In other words, the first data may be read from the seventh node.

Specifically, a manner of obtaining the read address may alternatively be: determining, based on a hash ID query mapping table, the read address corresponding to the hash ID. For example, if the hash ID is "123456", and a corresponding node is 005, a read address may be determined as 005, and indicate a fifth node in the distributed storage system. In other words, the first data may be read from the fifth node.

205: Read the data locally.

If the first data is stored locally, the first terminal may directly read the data locally.

For example, if the first data is stored locally, a local storage system (for example, a file system such as EXT4 or F2FS in an existing system) of the first terminal may be directly invoked to directly obtain the local data.

Therefore, in embodiments of this application, when the first data that the first terminal needs to access is non-local data, the first data may be obtained based on the first identifier of the first data. The first identifier is used to obtain the hash ID associated with the content of the first data, and address the first data based on the hash ID. There is no need to provide an interface for reading data across terminals for each terminal. According to the data reading method provided in this application, data can be read across terminals more accurately and efficiently. This can implement data sharing between terminals.

According to the data reading method provided in this application, specifically, the first terminal may send the first identifier to another terminal, and the another terminal searches for the hash ID, or the first terminal may directly search for the hash ID based on the locally stored first mapping relationship. In other words, there are a plurality of manners of obtaining the first data based on the first identifier. The following separately describes the manners with reference to FIG. 2.

Manner 1: The third terminal searches for the hash ID.

Figure 3:
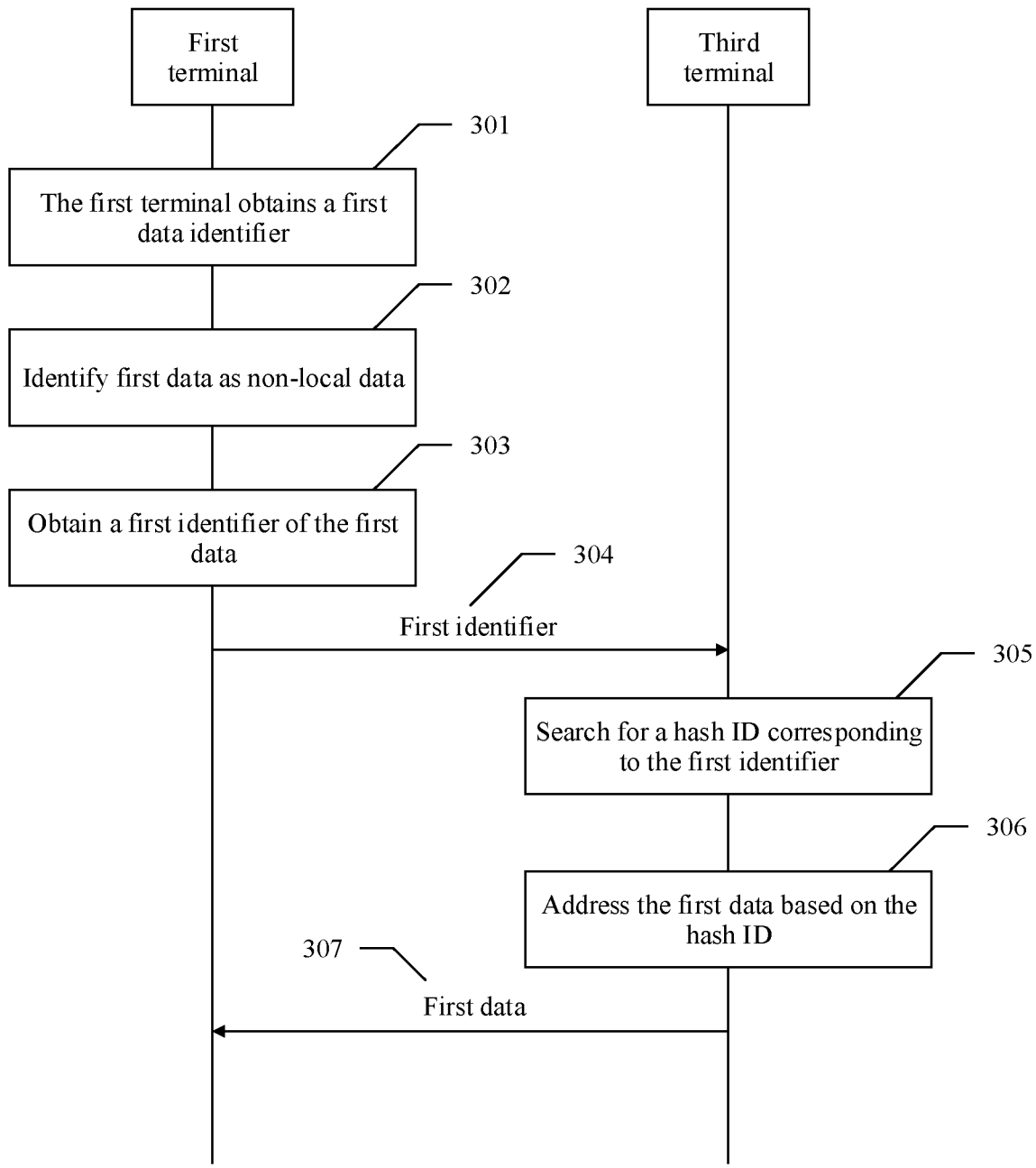
FIG. 3 is a schematic flowchart of another data reading method according to this application.

FIG. 3 is a schematic flowchart of a data reading method according to this application.

It should be noted that the following first terminal and third terminal are any two of the plurality of terminals mentioned in FIG. 1A.

301: The first terminal obtains a first data identifier.

302: The first terminal identifies first data as non-local data.

303: The first terminal obtains a first identifier of the first data.

It should be noted that step 301 to step 303 in this embodiment of this application are similar to step 201 to step 203. Details are not described herein again.

304: The first terminal sends the first identifier to the third terminal.

After obtaining the first identifier of the first data, the first terminal sends the first identifier to the third terminal, to obtain the first data by using the third terminal.

The first terminal may directly send the first identifier to the third terminal, or may generate a data tuple, and send the data tuple to the third terminal. The data tuple may include the first identifier, and may further include an operation (for example, a read or write operation) on the first data, content of the first data, and the like.

For example, before step 301, the first terminal further obtains an access request of the first data. The first terminal may convert the access request into the data tuple in a preset format, and send the data tuple to the third terminal. The data tuple includes the first identifier, and may further include a read operation on the first data, a size of the first data, and the like. The preset format may be a format agreed on by terminals in a distributed storage system, and is used to perform a read operation, a write operation, or the like on data.

305: The third terminal searches for a hash ID corresponding to the first identifier.

After receiving the first identifier, the third terminal searches for the hash ID corresponding to the first identifier. The hash ID is generated based on the content of the first data, and the first data is data stored based on the content.

Specifically, the third terminal stores a first mapping relationship. The first mapping relationship includes a mapping relationship between a unique identifier of each piece of data or each group of data in the distributed storage system and an identifier associated with content of each piece of data or each group of data. The first mapping relationship may be established or updated when data is stored.

Figure 16:
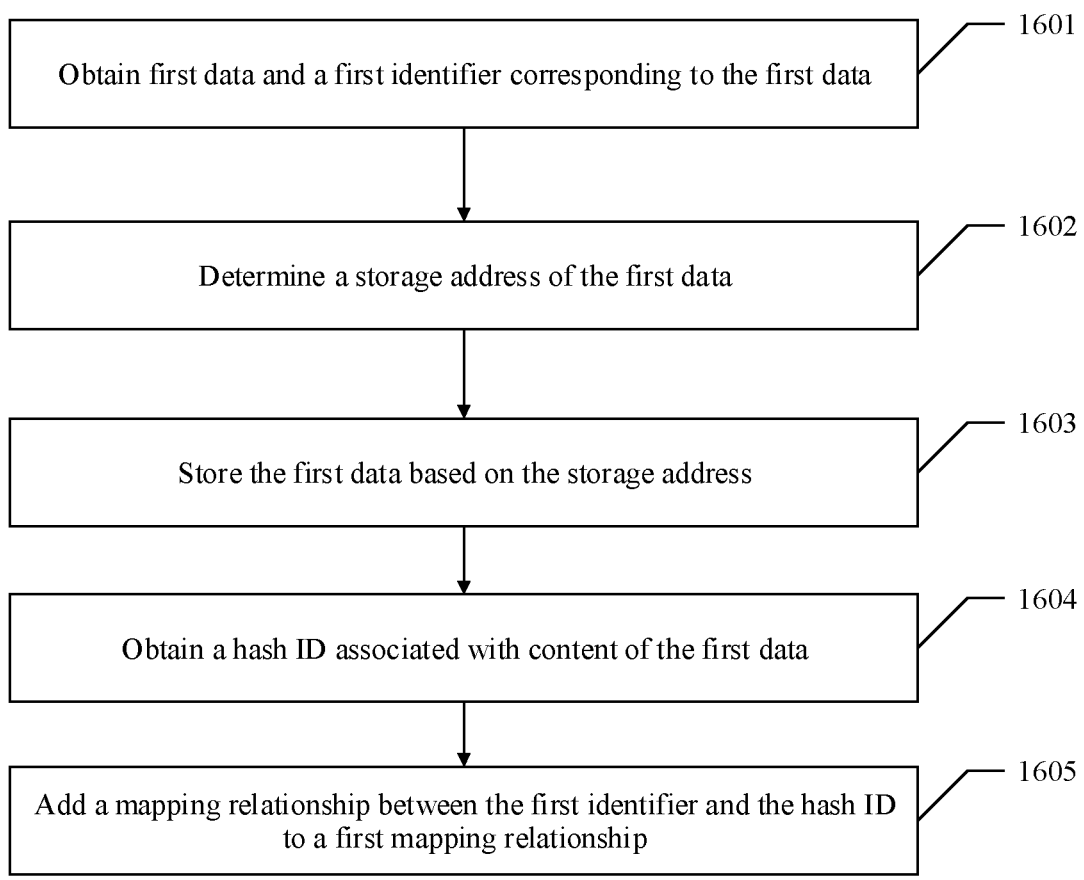
FIG. 16 is a schematic flowchart of a data storage method according to this application.
Figure 17:
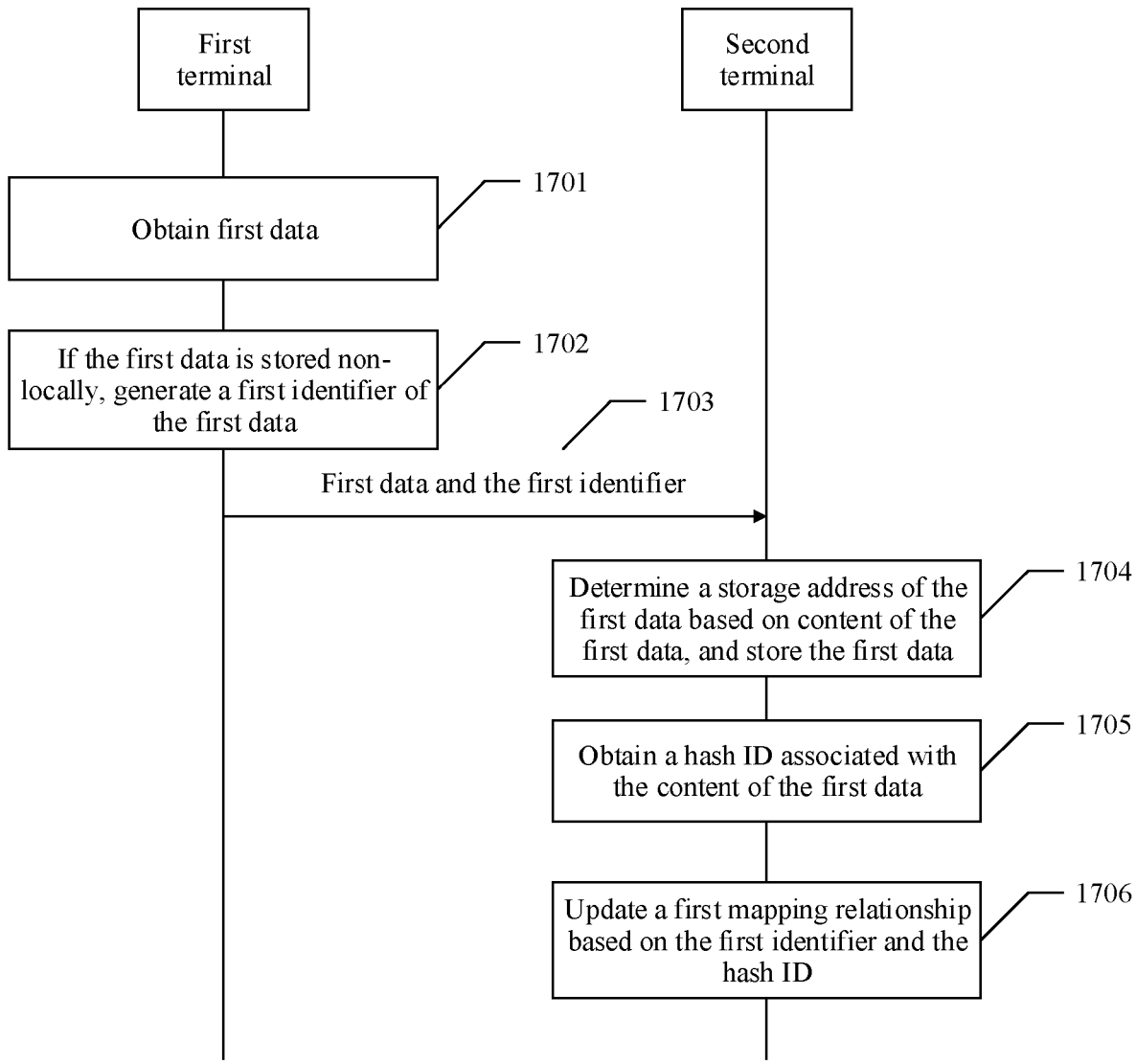
FIG. 17 is a schematic flowchart of a data storage method according to this application.
Figure 18:
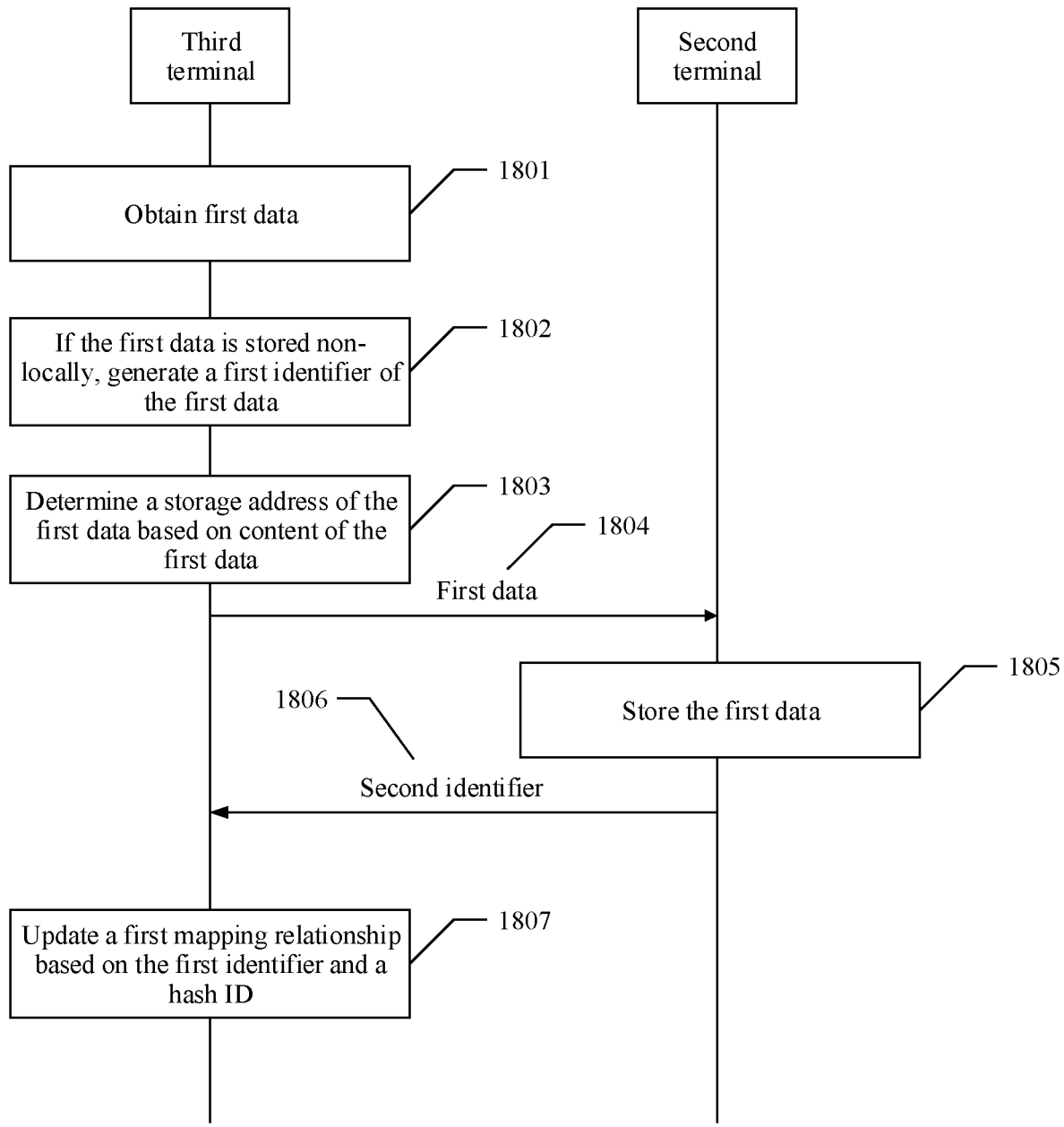
FIG. 18 is a schematic flowchart of a data storage method according to this application.

More specifically, for a procedure of establishing or updating the first mapping relationship, refer to related descriptions in FIG. 16 to FIG. 18. Details are not described herein.

For example, the first mapping relationship may be a mapping table, as shown in Table 2.

TABLE 2

| UUID | HID |
|---|---|
| 458731 | 10 |
| 458736 | 11 |
| 458739 | 12 |
| ... | ... |
| 943548 | 15 |

For example, if UUID (namely, the first identifier) received by the third terminal is 458731, it may be found, according to the mapping table, that a corresponding hash ID (namely, HID) is 10.

Usually, a length of the first identifier and a length of the hash ID may be adjusted based on a specific application scenario. For example, the length of the first identifier and the length of the hash ID may be 128 bits or 256 bits. For ease of description, only short UUID and short HID are used as an example for description herein, and do not constitute a limitation.

In a possible manner, the hash ID is obtained based on the content of the first data. It may be understood that data stored in the distributed storage system is stored based on content. This can reduce redundant data and increase storage efficiency.

In addition, if the data is stored based on the content of the data, when the content of the data changes, a storage location of the data may change. In this embodiment, a mapping relationship between the first identifier of the first data and the hash ID is maintained by using the first mapping relationship. Even if a location of the first data changes, only the hash ID corresponding to the first identifier in the first mapping relationship needs to be updated, and the first terminal does not need to be changed. This reduces workload of the first terminal.

306: The third terminal addresses the first data based on the hash ID.

After obtaining the hash ID, the third terminal addresses the first data based on the hash ID.

Specifically, the hash ID is obtained based on the content of the first data, and the first data is stored based on the content. Therefore, a read address of the first data may be determined based on the hash ID, and the first data is read based on the read address. If the read address indicates the third terminal, the first data may be directly read locally. If a second terminal stores the first data, the third terminal may send a read request to the second terminal, and receive the first data sent by the second terminal. For a manner of determining the read address of the first data based on the hash ID, refer to related descriptions in step 204. Details are not described herein again.

Optionally, the read address may indicate the second terminal, or the read address indicate a specific logical block address of the second terminal. This may specifically be set based on an actual application scenario. This is not limited in this application. If the read address indicates the second terminal, the third terminal may send the read request to the second terminal. The read request carries the hash ID, so that the second terminal finds the locally stored first data based on the hash ID. If the read address indicates a specific logical block address of the second terminal, the third terminal may send the read request to the second terminal. The read request carries the specific logical block address, indicated by the read address, of the second terminal, so that the third terminal reads a data block corresponding to the logical block address, to read the first data.

307: The third terminal sends the first data to the first terminal.

After obtaining the first data based on the hash ID, the third terminal sends the first data to the first terminal, so that the first terminal obtains the first data.

Figure 5:
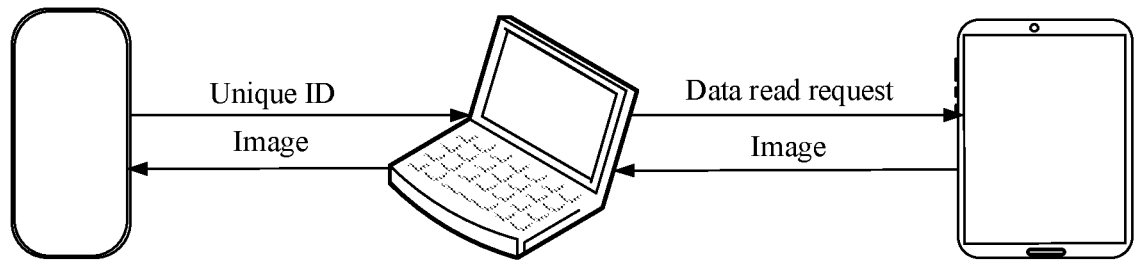
FIG. 5 is a schematic diagram of an application scenario according to an embodiment of this application.

The following describes the data reading method provided in this application by using a specific application scenario as an example. In a scenario, a user establishes a distributed storage system by using a plurality of terminals. The plurality of terminals include a mobile phone, a tablet computer, a television, a personal computer, and the like. For example, as shown in FIG. 5, a management module is disposed on the personal computer, and is configured to maintain the first mapping relationship. The first mapping relationship is a mapping relationship between an identifier of each piece of data or each group of data and an identifier associated with content of each piece of data or each group of data. When an application of the mobile phone needs to access one image stored in the tablet, the application generates an access request. After obtaining the access request, a file system of the mobile phone determines that the image is non-local data. Then, the mobile phone obtains a unique identifier (namely, the first identifier) of the image in the distributed storage system. Then, the file system of the mobile phone sends the unique identifier to the personal computer by using a network adapter driver. After obtaining the unique identifier, the management module in the personal computer searches the first mapping relationship for a hash ID corresponding to the unique identifier. The hash ID is associated with content of the image, and the image is stored based on the content. The personal computer may determine, based on the hash ID, that the image is stored in the tablet computer, and then send the hash ID to the tablet computer by using a network, to request the image from the tablet computer. After receiving a read request from the personal computer, the tablet computer sends the image to the personal computer. After receiving the image sent by the tablet computer, the personal computer forwards the image to the mobile phone, so that the mobile phone can obtain the image.

Therefore, in this embodiment of this application, when the first terminal needs to read the data stored in the second terminal, the first terminal only needs to send the identifier of the data to the third terminal. The third terminal may search, based on the identifier of the data, for the hash ID associated with the content of the data, to obtain the hash ID to determine the read address of the data, and then read the data from the second terminal indicated by the read address. The third terminal sends the data to the first terminal, so that the first terminal can read the data across terminals. There is no need to provide an interface for reading data across terminals for each terminal. According to the data reading method provided in this application, data can be read across terminals more accurately and efficiently. This can implement data sharing between terminals.

Manner 2: The first terminal searches for the hash ID.

Figure 6:
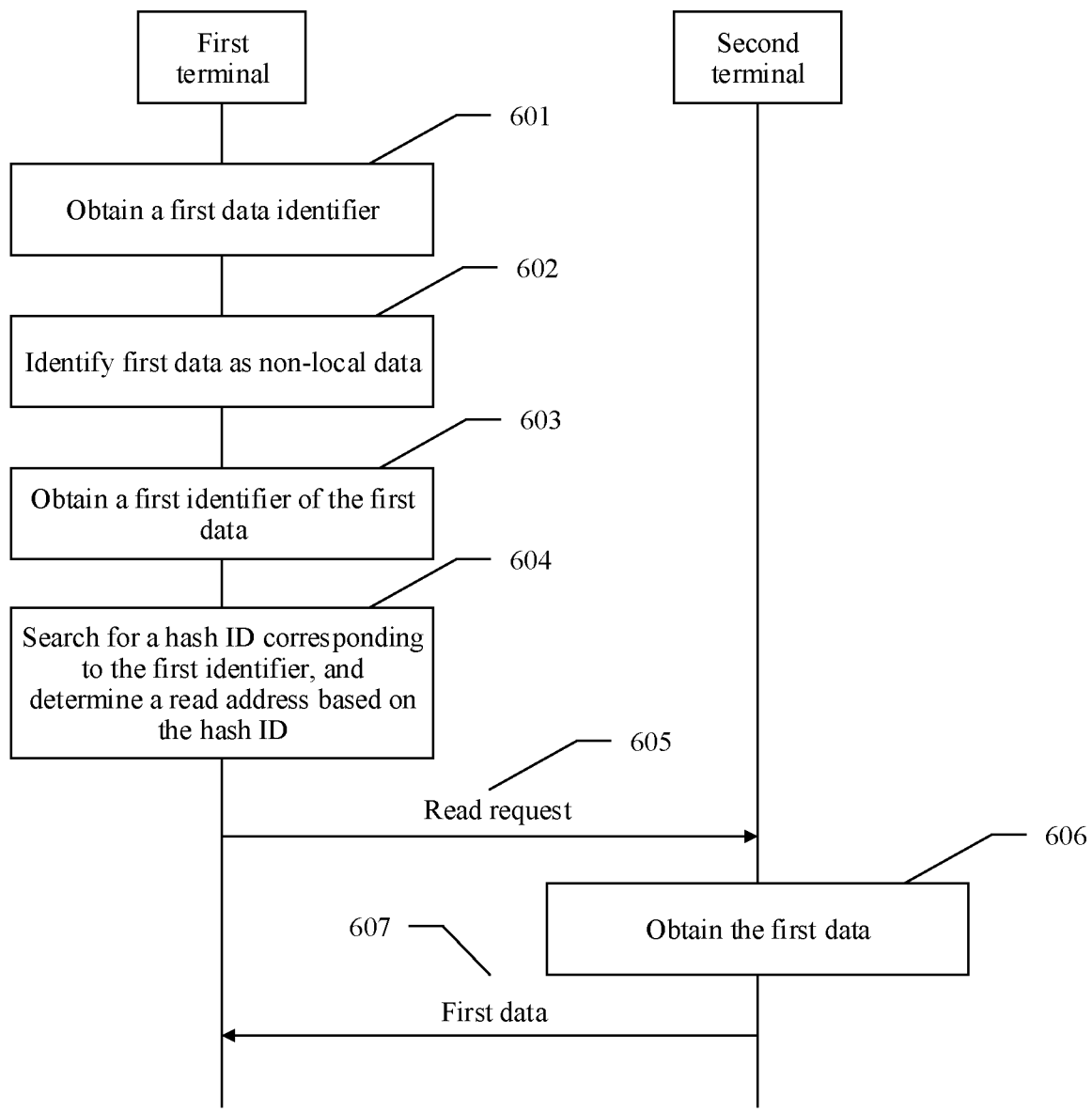
FIG. 6 is a schematic flowchart of another data reading method according to this application.

FIG. 6 is a schematic flowchart of another data reading method according to this application.

601: The first terminal obtains a first data identifier.

602: The first terminal identifies first data as non-local data.

603: The first terminal obtains a first identifier of the first data.

It should be noted that step 601 to step 603 are similar to step 301 to step 303. Details are not described herein again.

604: The first terminal searches for a hash ID corresponding to the first identifier, and determines a read address based on the hash ID.

Step 604 is similar to step 305, and a difference lies in that the first terminal, instead of the third terminal, searches for the hash ID. A specific manner of searching for the hash ID is similar.

605: The first terminal sends a read request to the second terminal.

After determining that the first data is stored in the second terminal, the first terminal sends the read request to the second terminal to request to read the first data. The read request may carry the hash ID, requesting to read data corresponding to the hash ID.

For example, after determining that the first data is stored in the second terminal, the first terminal may obtain an address of the second terminal, and send the read request to the second terminal by using the address. The read request may carry the hash ID, so that the first terminal reads the first data based on the hash ID.

606: The second terminal obtains the first data.

After receiving the read request of the first terminal, the second terminal obtains, based on the read request, the first data from locally stored data.

The read request carries the hash ID. The second terminal may determine, based on the hash ID by using a hash operation, an address corresponding to the hash ID, and read the first data based on the address. For example, the hash ID is associated with a storage location (for example, a logical block address of a local hard disk) of the local hard disk storing the first data, and the second terminal may determine, based on the hash ID, a sector storing the first data, and read data in the sector, to obtain the first data.

607: The second terminal sends the first data to the first terminal.

After reading the first data, the second terminal sends the first data to the first terminal.

Step 607 in this embodiment is similar to step 307. Details are not described herein again.

The following describes the data reading method provided in this application by using a specific application scenario as an example. In a scenario, a user establishes a distributed storage system by using a plurality of terminals. The plurality of terminals include a mobile phone, a tablet computer, a television, a personal computer, and the like. A management module is disposed on the mobile phone, and is configured to maintain a first mapping relationship. The first mapping relationship is a mapping relationship between the hash ID and an identifier of each piece of data or each group of data. When an application of the mobile phone needs to access one image stored in the tablet, the application generates an access request for data. After obtaining the access request for data, a file system of the mobile phone determines that the image is non-local data. Then, the file system obtains a unique identifier of the image. Then, the file system of the mobile phone sends the unique identifier to the management module. After obtaining the unique identifier, the management module searches the first mapping relationship for a hash ID corresponding to the unique identifier. The hash ID is generated based on content of the image. The management module may determine, based on the hash ID, that a read address of the image indicates the tablet computer, and then send a read request to the tablet computer by using a network. The read request carries the hash ID, to request the image, so as to feed back the image to the application of the mobile phone.

Therefore, in this embodiment of this application, when the first terminal needs to read the data across terminals, the first terminal may search, based on the unique identifier of the data, for the hash ID associated with the content of the first data, and further determine the read address of the first data based on the hash ID. Then, the first data is read from the second terminal based on the read address, so that the first terminal can read the data across terminals. This can implement data sharing between terminals.

This application further provides a first terminal. The following describes the first terminal provided in this application.

Figure 7:
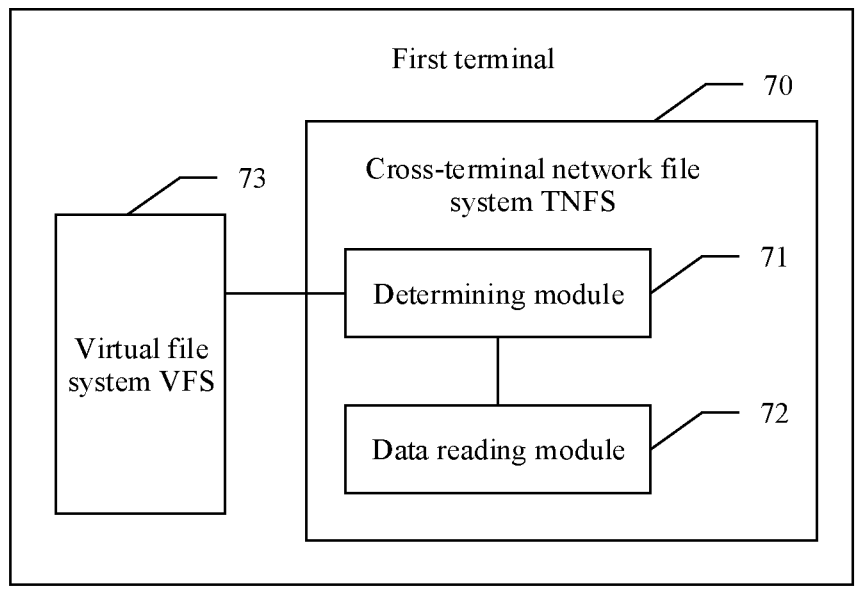
FIG. 7 is a schematic diagram of a structure of a first terminal according to this application.

FIG. 7 is a schematic diagram of a structure of a first terminal according to this application. The first terminal includes a determining module 71 and a data reading module 72.

The determining module 71 and the data reading module 72 may be included in a TNFS 70 of the first terminal.

The determining module 71 is configured to obtain a first data identifier, and determine, based on the first data identifier, whether first data is local data, where the first data is to-be-read data.

The data reading module 72 is configured to: when the determining module 71 determines that the first data is non-local data, obtain a first identifier of the first data, and obtain the first data based on the first identifier.

The first identifier is used to obtain a hash ID corresponding to the first data, the hash ID is generated based on content of the first data, and is used to determine a read address of the first data, and the read address indicates to address the first data from the second terminal.

Optionally, the first terminal may further include a file system module 73. The file system module 73 is configured to receive an access request for the first data. The access request may carry a file name of the first data, an access operation requested to be performed on the first data, and the like. The first data identifier may be obtained based on the access request.

In a possible implementation, the file system module may be disposed in a VFS, or may be independently disposed in the first terminal, or may be disposed in another module of the first terminal. For ease of understanding, the following implementations are described by using an example in which the file system module is a VFS.

In a possible implementation, the first data is data that is determined based on an input operation and that a user requests to access, or data that a process in the first terminal requests to invoke.

In a possible implementation, the first data identifier is an identifier used to identify whether the first data is local data, and the first data identifier is obtained based on the file name of the first data. The determining module may directly determine, based on the first data identifier, whether the first data is local data.

In a possible implementation, the first identifier includes storage path information obtained based on the file name of the first data, and the determining module may determine, based on the storage path information, whether the first data is local data.

The storage path information may be obtained by the VFS through converting the file name included in the access request.

In a possible implementation, the first identifier includes a variable used to identify whether the first data is local data. The variable may be a variable read, based on the file name of the first data, from corresponding structure data. The determining module may determine, based on the variable, whether the first data is local data.

In a possible implementation, the first data identifier includes information, for example, a process name or a process identifier of a first process, about the first process corresponding to the first data.

The determining module is specifically configured to: determine, based on the information about the first process and a second mapping relationship, whether the first data is local data. The second mapping relationship includes a mapping relationship between the process and a storage identifier, and the storage identifier is used to identify whether the data corresponding to the process is stored locally. For example, the information about the first process includes the process name of the first process, and the second mapping relationship may include a mapping relationship between the process identifier and the storage identifier used to identify whether the data is stored locally.

In a possible implementation, the second mapping relationship is obtained based on data input by a user. Therefore, the user may determine whether the data of the process is stored locally or across terminals. This can improve user experience.

In addition, in this application, if the first terminal locally stores a first mapping relationship, the data reading module 72 may locally read the corresponding hash ID by using the first identifier of the first data. If the first terminal does not locally store the first mapping relationship, the data reading module 72 needs to send the first identifier to a third terminal that stores the first mapping relationship. The following separately describes structures of the first terminal in different scenarios.

Structure 1

Figure 8:
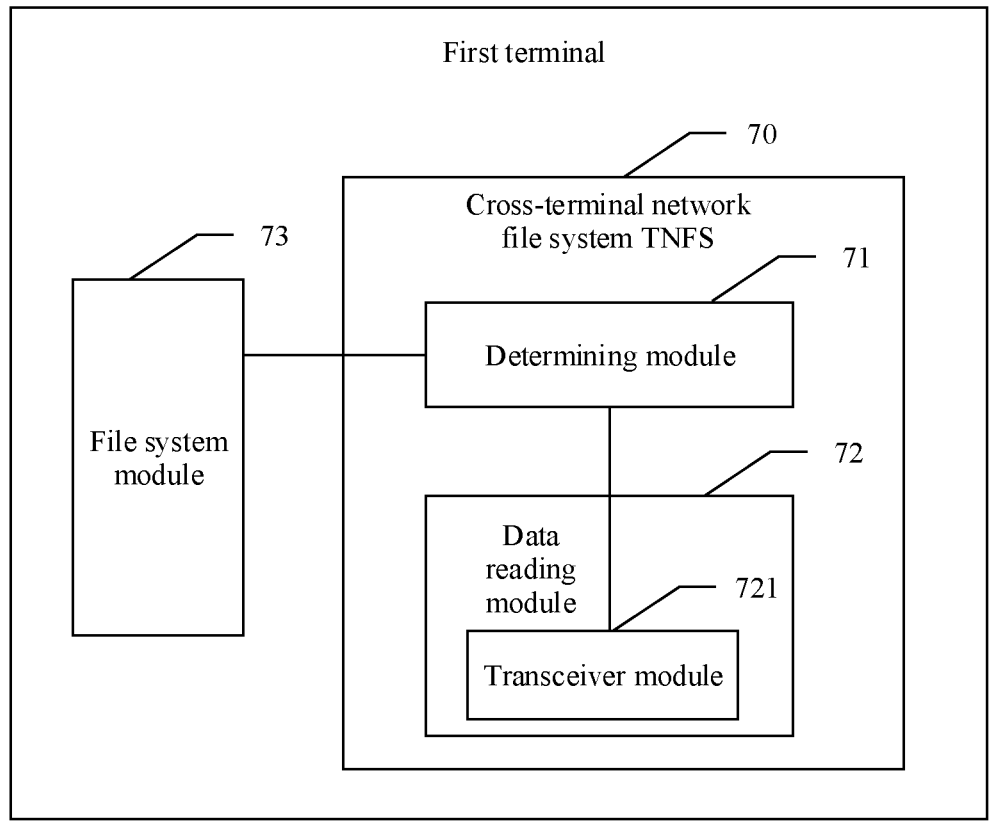
FIG. 8 is a schematic diagram of a structure of another first terminal according to this application.

FIG. 8 is a schematic diagram of a structure of another first terminal according to this application.

The data reading module 72 may include a transceiver module 721.

The transceiver module 721 is configured to send the first identifier to the third terminal, so that the second terminal searches, based on the first identifier, the first mapping relationship for the corresponding hash ID. The hash ID is associated with the content of the first data. Therefore, the second terminal may determine the read address of the first data based on the hash ID, and the read address indicates to address the first data from the second terminal.

The transceiver module 721 is further configured to receive the first data sent by the second terminal.

The following is described by using a structure of a specific terminal as an example.

The following first describes related concepts.

An interplanetary file system (interplanetary file system, IPFS) is a peer-to-peer distributed storage system, and may be logically divided into the following five layers.

A first layer is a naming (Naming) space layer. Global naming space is implemented based on a public key infrastructure (public key infrastructure, PKI), and a unique global identifier (identifier, ID) is generated based on content of a data block. Different data blocks have different global IDs. If content of a data block is modified, a new global ID needs to be generated for the data block.

A second layer is a Merkle directed acyclic graph (Merkle DAG) layer, and is an internal logical data structure of the IPFS.

A third layer is a data exchange (exchange) layer, and implements a protocol for exchanging block data between nodes.

A fourth layer is a routing (routing) layer, and implements node addressing and object addressing.

A fifth layer is a network (network) layer, and encapsulates connection and data transmission of peer-to-peer communication.

It can be understood that the IPFS provides a content-based addressing and peer-to-peer distributed storage system. Redundant data in the storage system can be eliminated in a content-based addressing manner, that is, data is stored based on content.

In the following implementations of this application, a cross-terminal file system in this application is implemented based on the IPFS, and the cross-terminal file system is referred to as a T-IPFS in the following. In addition to implementing the cross-terminal file system in this application based on the IPFS, the cross-terminal file system in this application may also be implemented by using another file system, for example, a named data networking (Named Data Networking, NDN) file system whose main core is a content centric network (content centric network, CCN). The following embodiments are described only by using an example in which the T-IPFS is implemented based on the IPFS.

A cross-terminal network file system (terminal network file system, TNFS) is used to process data that needs to be accessed across terminals, and is disposed in the operating system kernel included in the foregoing terminal in FIG. 1B or FIG. 1C.

Figure 9:
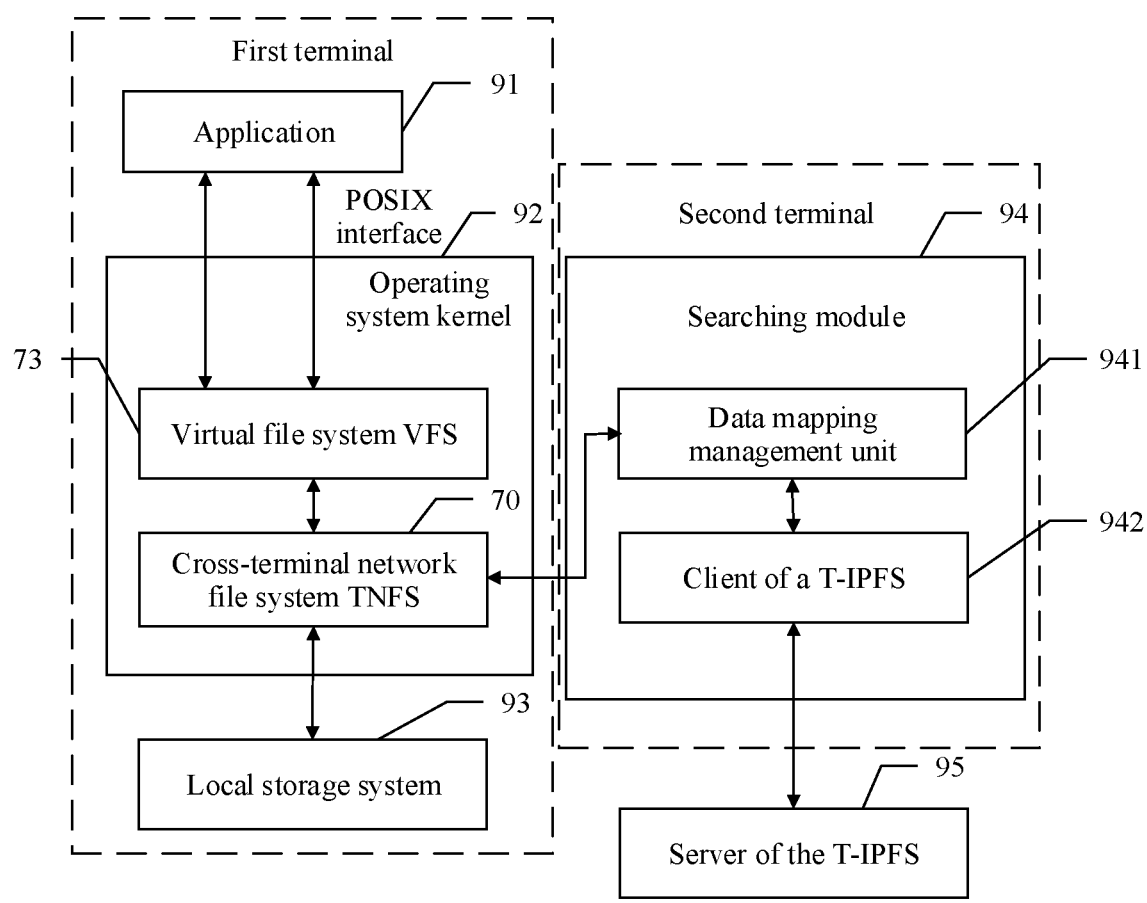
FIG. 9 is a schematic diagram of a structure of another first terminal according to this application.

Refer to FIG. 9. The following describes a structure of a first terminal according to this application by using the Android system as an example. The first terminal shown in FIG. 9 may be configured to perform steps of the method performed by the first terminal in FIG. 2 or the first terminal in FIG. 3. The third terminal shown in FIG. 9 may be configured to perform steps of the method performed by the third terminal in FIG. 3.

The first terminal may include an application 91, an operating system kernel 92, a local storage system 93, a searching module 94, and a server (server) 95 of the T-IPFS. The operating system kernel 92 includes a VFS 73 and a TNFS 70.

The third terminal may include the searching module 94. The searching module 94 may specifically include a data mapping management unit 941 and a client (client) 942 of the T-IPFS.

The server 95 of the T-IPFS may be disposed on the third terminal, or may be disposed on a second terminal.

There is a portable operating system interface (portable operating system interface, POSIX) between the VFS 73 and the application 91, and the application 91 may perform an operation such as data read or write by using the VFS 73.

The TNFS 70 is configured to perform a data-related operation, for example, an operation such as data reading or data writing. In addition, other than the TNFS 70, the first terminal may further have another file system, for example, a fourth extended file system (Fourth Extended File System, EXT4) or a flash-friendly file system (flash-friendly file system, F2FS) in the Android system.

The data mapping management unit 941 is configured to manage the foregoing first mapping relationship, including updating or establishing the first mapping relationship.

The client (client) of the T-IPFS is configured to request the server (server) of the T-IPFS to read or write data.

The server of the T-IPFS is configured to: receive a read request sent by the client (client) of the T-IPFS, read corresponding data, dynamically discover, route, and manage a storage node, and store data.

One or more clients of the T-IPFS and one or more servers of the T-IPFS form an IPFS.

Figure 10:
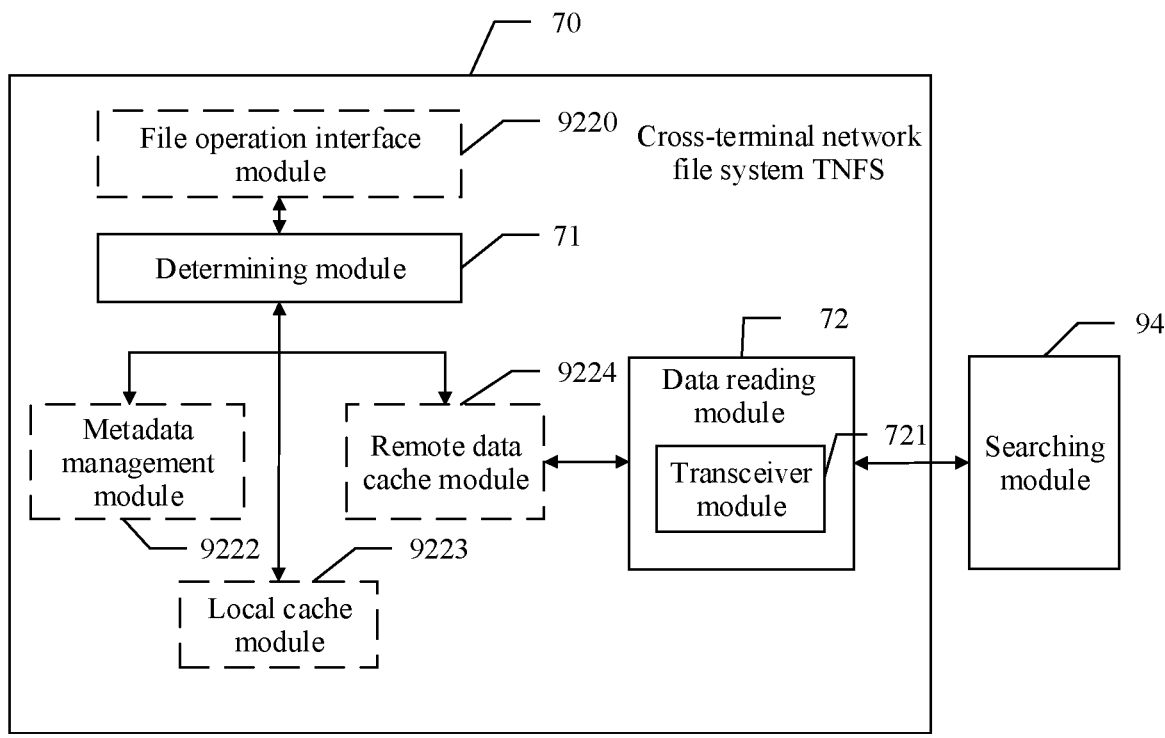
FIG. 10 is a schematic diagram of a structure of another first terminal according to this application.

Further, the TNFS 70 may further include more modules. As shown in FIG. 10, the TNFS 70 may further include a determining module 71 and a data reading module 72. The data reading module 72 may include a transceiver module 721.

The determining module 71 is configured to determine whether first data that the VFS 73 requests to read is local data. For a specific determining manner, refer to related descriptions in step 202. In other words, the determining module 71 may be configured to perform step 202 in FIG. 2. Details are not described herein again.

The data reading module 72 is configured to: when the determining module determines that the first data is non-local data, obtain a first identifier of the first data, and obtain the first data based on the first identifier.

Specifically, the transceiver module 721 is an interface to communicate with the searching module 94, and is configured to: communicate with the searching module 94 by using 4G/5G, Wi-Fi, or the like, and send, to the searching module 94, an operation instruction for data that needs to be searched for.

The transceiver module 721 is specifically configured to: when the determining module 71 determines that the first data is non-local data, send the first identifier of the first data to the searching module 94 of the third terminal, so that the searching module 94 obtains the first data based on the first identifier. In other words, the transceiver module 721 is configured to perform step 304. Details are not described herein again.

The transceiver module 721 is further configured to receive the first data fed back by the searching module 94. In other words, the transceiver module 721 is configured to perform step 307 of receiving the first data fed back by the second terminal.

Optionally, the TNFS 70 may further include a file operation interface module 9220, a metadata management module 9222, a local cache module 9223, a remote data cache module 9224, and the like. In addition, the transceiver module 721 is connected to the searching module 94.

The file operation interface module 9220 is configured to provide a file operation interface for the VFS 73, and receive a data operation transferred by the VFS 73, for example, a read operation or a write operation.

The metadata management module 9222 is responsible for managing file-related metadata such as an inode. The inode is a standard component in a Linux operating system kernel used by the Android operating system. A remote data identifier is added to the inode to distinguish whether data is stored locally or in the T-IPFS. If the data is stored in the T-IPFS, a unique identifier UUID, namely, the first identifier, of the data in the distributed storage system is generated.

The local cache module 9223 caches data stored in the local storage system. The local cache module is optional. For details, refer to a local cache mechanism of the Android Ext4 file system.

The remote data cache module 9224 caches received data. The remote data cache module is optional. In other words, the received data may not be cached. For details, refer to a local cache mechanism of the Android Ext4 file system.

After receiving the first identifier sent by the TNFS 70, the data mapping management unit 941 of the second terminal searches the first mapping relationship for a hash ID corresponding to the first identifier, and transfers the hash ID to the client of the T-IPFS.

After receiving the hash ID, that is, HID is used as an example, the client of the T-IPFS receives the hash ID in naming space based on the foregoing logical layers. The Merkle DAG layer searches a topology structure of the distributed storage system based on the HID, and determines, by querying a table, performing a hash operation, or the like, a second terminal corresponding to the hash ID. The exchange layer determines a communication protocol for communicating with the second terminal. The routing layer completes addressing for the second terminal according to the communication protocol, communicates with the server of the T-IPFS by using the network layer, and reads the first data from the second terminal.

The following further describes the application scenario in the embodiments shown in FIG. 3 with reference to FIG. 8 to FIG. 10.

The file operation interface module in the TNFS may provide implementation of file interfaces such as open (open), read (read), write (write), and close (close). Storage path information, a file name, and the like of the first data sent by the VFS are received by using the plurality of file interfaces. A first data identifier may be directly obtained by the VFS through converting a received access request, for example, the storage path information, or may be a variable in structure data obtained based on the file name transferred by the TNFS to the VFS, or may be information about a first process read by the TNFS, for example, a process name or a process identifier.

Usually, before the first data is read, the first data needs to be opened, that is, an open operation needs to be performed on the first data first.

Figure 11A:
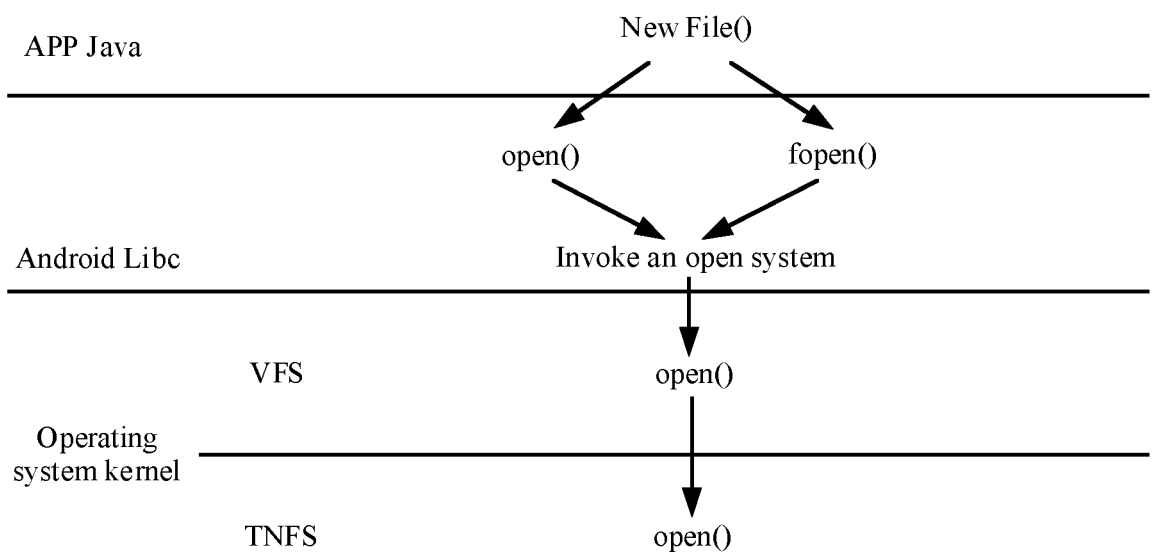
FIG. 11A is a schematic flowchart of an operation of opening a file according to this application.
Figure 11B:
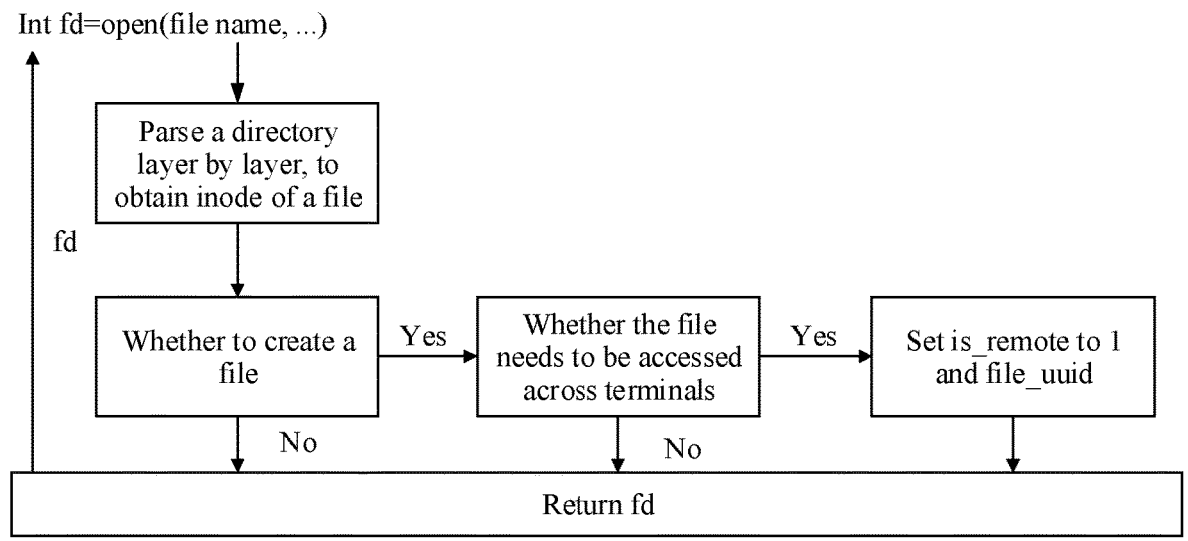
FIG. 11B is a schematic flowchart of another operation of opening a file according to this application.

Specifically, when an Android application runs, the open operation on a file of the Android application needs to be performed at a plurality of layers. For example, as shown in FIG. 11A, first, a new File ( ) operation in APP Java code is performed, an operating system kernel is entered by invoking an open function or a fopen function of Android Libc and by invoking the open operation by the system. In the operating system kernel, after receiving an input parameter of the open operation, the VFS invokes the open operation at a VFS layer. After invoking the open operation, the VFS receives data transferred from the VFS through the open interface provided by the file operation interface module, and then invokes the open operation in the TNFS. For example, as shown in FIG. 11B, a parameter input by the VFS, for example, a file name and a data length, is received by using the file operation interface module. Then, parsing is performed layer by layer based on the parameter, and an inode parameter of the file is obtained by using the metadata management module. Then, whether the file is newly created is determined based on the inode parameter. If the file is not newly created, that is, the file is stored locally, fd is directly returned. If the file is newly created, that is, the file is stored non-locally, whether the file needs to be accessed across terminals continues to be determined. Whether the file needs to be accessed across terminals may be determined based on an access frequency and a corresponding process of the file. If the file does not need to be accessed across terminals, fd is returned. If the file needs to be accessed across terminals, is_remote of the file is set to 1. The metadata management module reads file_uuid in the inode of the file and returns fd.

After the file is opened, the return value fd of the open function is obtained and is substituted into the read function to perform the read operation, that is, read the file.

Figure 12A:
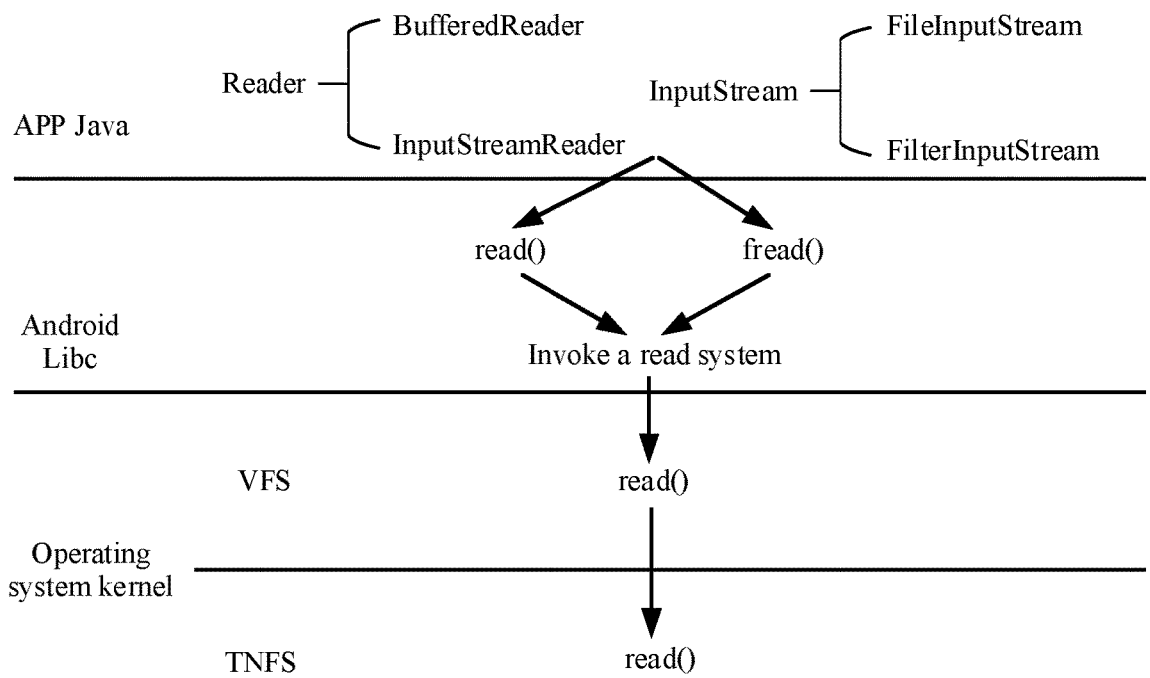
FIG. 12A is a schematic flowchart of an operation of reading a file according to this application.
Figure 12B:
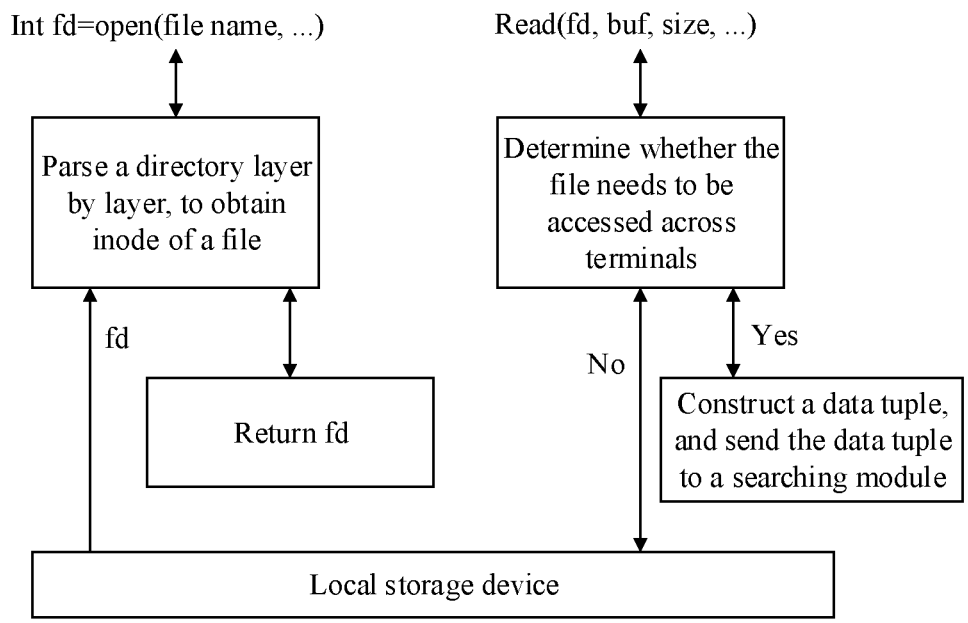
FIG. 12B is a schematic flowchart of an operation of reading a file according to this application.
Figure 13:
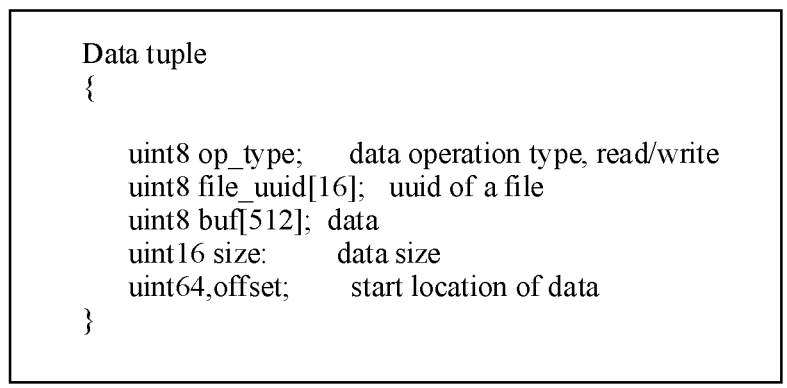
FIG. 13 is a schematic diagram of a structure of a data tuple according to this application.

When the application runs, the read operation on the file of the application also needs to be performed at a plurality of layers. For example, as shown in FIG. 12A, first, a stream operation, for example, a character stream Reader operation and a byte stream InputStream operation, in APP Java code is performed. Then, the stream operation is converted to a read function or a fread function for further processing. Then, a parameter output by the read function or the fread function at an Android libc layer is transferred to the operating system kernel, and the read function in the operating system is invoked. For example, as shown in FIG. 12B, in the operating system kernel, a read ( ) function of the VFS is first invoked for processing. The first data identifier, for example, the storage path information of the first data, may be output by using the read ( ) function of the VFS. The determining module determines whether the first data needs to be accessed across terminals, specifically, determining based on is_remote in the inode structure data of the first data. When is_remote=0, it is determined that the first data is local data and does not need to be accessed across terminals. When is_remote=1, it is determined that the first data is non-local data and needs to be accessed across terminals. If it is determined that the first data needs to be accessed across terminals, file_uuid is read from the inode structure, a data tuple is constructed based on file_uuid, and the data tuple is sent to the searching module of the second terminal. As shown in FIG. 13, the constructed data tuple may include an operation type of data, such as a read or write operation, UUID of a file, a cache length for storing data, a size of data, a start location of data, and the like.

In addition, the first mapping relationship maintained in the data mapping management unit is described by using an example. The data mapping management unit stores the first mapping relationship, and the first mapping relationship may be established and stored in a form of a mapping table. For example, the first mapping relationship may be shown in Table 3.

TABLE 3

| Field | Type | Null | Remark |
| --- | --- | --- | --- |
| UUID | Varchar (64) | N | Globally unique identifier file_uuid of a file |
| HID | Varchar (128) | Y | Hash value reviewed based on content of data |
| isUpload | tinyint | N | Indicate whether the file is uploaded to a T-IPFS; 1 indicates that the file is uploaded; 0 indicates that the file is not uploaded |
| isDelete | tinyint | N | Indicate whether the file is deleted from the second terminal; 1 indicates that the file is deleted; 0 indicates that the file is not deleted |
| path | text | N | Relative path of the file stored in the second terminal |
| isOpen | tinyint | N | Indicate whether a file is opened; 1 indicates that the file is opened; 0 indicates that the file is not opened and a default value is 0 |
| isDirty | tinyint | N | Indicate whether the file is dirty in Agent; 1 indicates the file is dirty; 0 indicates the file is clean |

Type indicates a type of data stored in each field. Null indicates whether a value of the field is null. Remark indicates a remark added to the field. The following describes each field.

UUID is a unique identifier of data.

HID is a value (namely, a hash ID) associated with content of the data.

isUpload is used to identify whether the data is uploaded to the T-IPFS.

isDelete is used to identify whether the data is deleted from the second terminal.

path indicates a data storage path.

isOpen indicates whether a file corresponding to the data is opened.

isDirty indicates whether the file is edited.

isUpload, isDelete, path, isOpen, and isDirty are optional.

HID is calculated by using a hash algorithm. For example, a specific algorithm may include: performing complex numerical calculation including operations such as addition, subtraction, multiplication, division, exclusive OR, and a modulo operation on binary data including a name/content of a file, to obtain a digital sequence of a specific length, namely, HID. For example, the hash algorithm may be a message-digest algorithm (message-digest algorithm, MD4), an MD5, or a secure hash algorithm (secure Hash algorithm, SHA). More specifically, for a manner of generating HID, refer to related descriptions in step 1602. Details are not described herein.

The data mapping management unit may find a corresponding mapping table based on the UUID. If a value of the field isUpload is 1, it indicates that the file is uploaded to the T-IPFS, that is, the file is sent to the second terminal. If a value of the field isUpload is 0, it indicates that the data is in the third terminal.

If a value of the field isUpload is 1, the field isDelete is queried. If a value of the field isDelete is 1, it indicates that the file is deleted from the third terminal. Then, the client of the T-IPFS invokes the server of the T-IPFS to read the data corresponding to HID, stores the data in the third terminal, and then sets the value of the field isDelete to 0.

If it is determined, based on isUpload, isDelete, or the like, that the first data is stored in the third terminal, the data may be addressed by using a path corresponding to the field path, a start location and a size of the to-be-read file are determined by using the received data tuple, and the read data is returned to the TNFS of the first terminal, to complete the read operation on the data from the TNFS. If it is determined, based on isUpload, isUpload, isDelete, or the like, that the first data is not stored in the third terminal, it may be determined, by using HID, the second terminal that stores the first data, HID is sent to the second terminal, a data block sent by the second terminal based on HID is received, a start location and a size of the to-be-read file are determined by using a data tuple in the data block, and the read data is returned to the TNFS of the first terminal.

Therefore, in this embodiment, the T-IPFS performs content-based addressing, that is, determines a storage location based on the content of the data, and generates the hash ID associated with the content of the data. Therefore, the storage location of the data may be determined by using the hash ID associated with the content of the data, and the data is read. Instead of a conventional manner in which data is read based on an index such as a file path, a file name, or an object, the content-based addressing manner can reduce redundant data, determine a storage location of data based on a hash ID associated with content, and read the data. This increases accuracy and efficiency of accessing data across terminals. In addition, subsequently, only the first mapping relationship needs to be maintained, and there is no need to store each path of data stored across terminals, to reduce workload of the first terminal, and reduce an amount of data stored in the first terminal.

Structure 2

Figure 14:
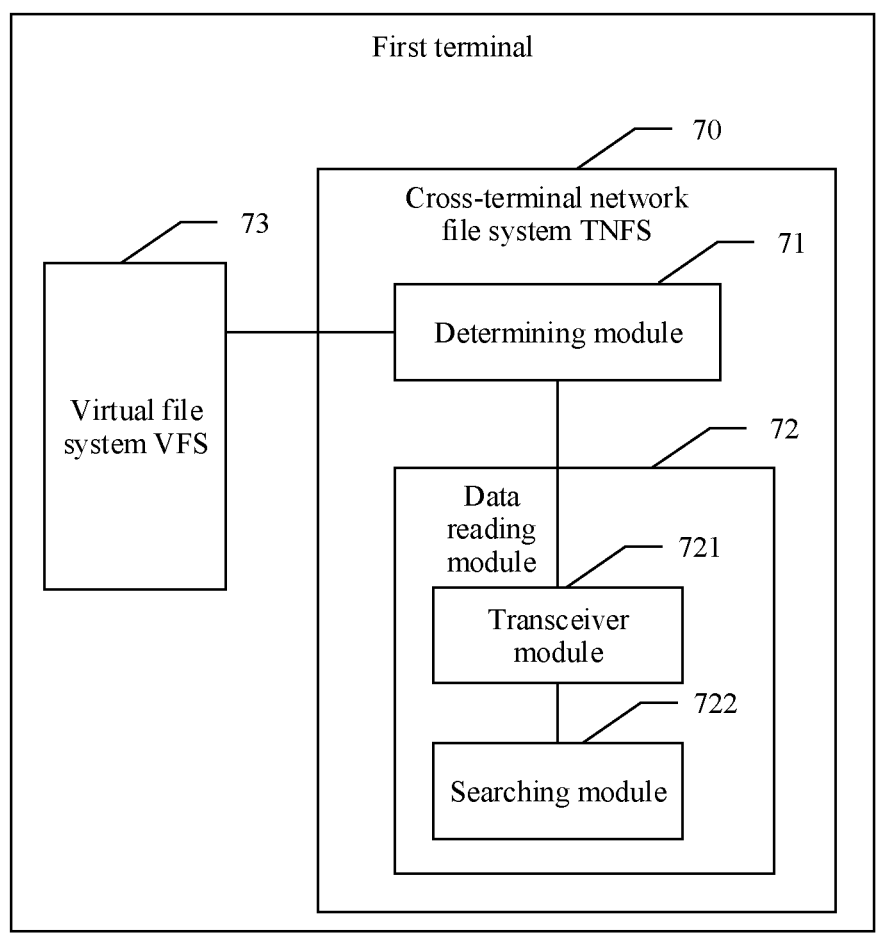
FIG. 14 is a schematic diagram of a structure of another first terminal according to this application.

FIG. 14 is a schematic diagram of a structure of another first terminal according to this application.

The data reading module 72 may include the transceiver module 721 and a searching module 722.

The searching module 722 is configured to: search, according to a first mapping relationship, for a hash ID corresponding to a first identifier, and determine, based on the hash ID, a second terminal that stores first data.

The transceiver module 721 is configured to: send a read request to the second terminal based on a read address, and receive the first data sent by the second terminal based on the read request.

Figure 15:
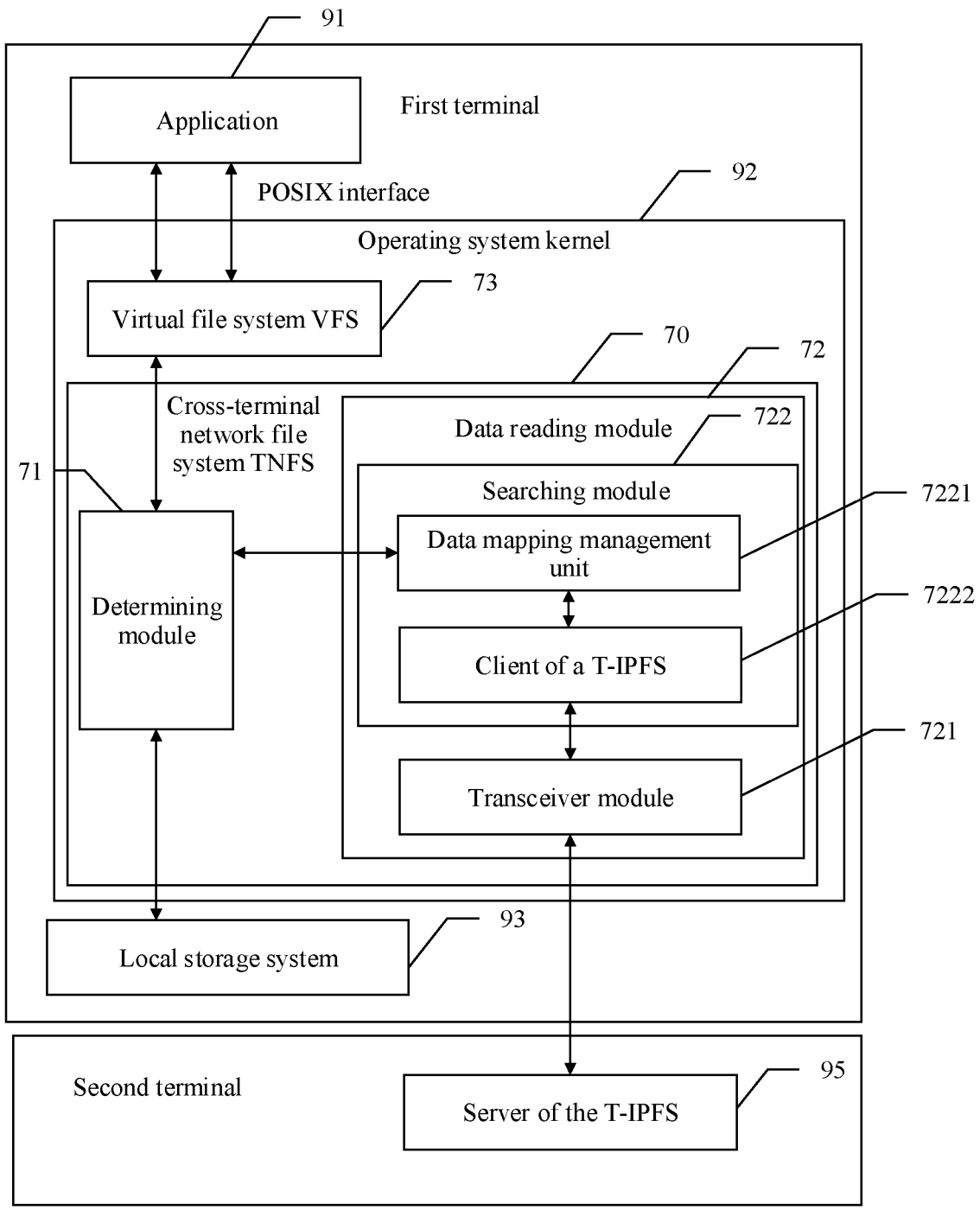
FIG. 15 is a schematic diagram of a structure of another first terminal according to this application.

Refer to FIG. 15. The following describes a data reading method according to this application by using the Android system as an example.

The following describes in detail the application scenario of the embodiment provided in Manner 2 by using some specific structures of terminals.

A structure of the first terminal is similar to that in FIG. 9 and FIG. 10, and a same part is not described herein again. A difference lies in that the data reading module 72 further includes the searching module 722, and the searching module 722 may specifically include a data mapping management unit 7221 and a client of the T-IPFS. A function of the searching module 722 is the same as that of the searching module 94 disposed in the third terminal in FIG. 9.

It should be noted that the searching module 722 may be disposed in the TNFS 70, or may be disposed in the operating system kernel 92 independent of the TNFS 70, or may be disposed in the first terminal independent of the operating system kernel 92. Specifically, adjustment may be performed based on an actual application scenario. In this embodiment, that the searching module 722 is disposed in the TNFS 70 is merely used as an example for description, and is not limited.

The determining module 71 in the TNFS is configured to determine whether the first data corresponding to the first data identifier transferred from the VFS 73 is stored in a local storage system. When the data is not stored in the local storage system, the searching module 722 may be invoked through a local remote procedure call (remote procedure call, RPC), to search for HID corresponding to the data, determines, by using HID, a second terminal that stores the to-be-read data, and obtains the data from the second terminal.

Specifically, when the determining module 71 determines that the first data is non-local data, the data mapping management unit is invoked by using the RPC to search for the hash ID corresponding to the first identifier of the first data.

The client 7222 of the T-IPFS determines, based on the hash ID, the second terminal that stores the first data. The client 7222 of the T-IPFS sends a read request to the server 95 of the T-IPFS of the second terminal by using the transceiver module 721, where the read request carries the hash ID.

After receiving the read request, the server 95 of the T-IPFS of the second terminal reads a data block from locally stored data based on the hash ID, and sends the data to the transceiver module 721.

After the transceiver module 721 receives the data block, the client 7222 of the T-IPFS reads the first data from the data block based on information, for example, a start location and a length, carried in a data tuple, and feeds back the first data to the application 91 by using the mapping management unit 7221, the determining module 71, and the VFS 73. Therefore, the application 91 can successfully read the first data that needs to be read.

The foregoing describes in detail the data reading method provided in this application. Before data is accessed, the data may further be stored. With reference to FIG. 1A to FIG. 15, the following describes a data storage method performed by a third terminal provided in this application.

FIG. 16 is a schematic flowchart of a data storage method according to this application.

1601: Obtain first data and a first identifier corresponding to the first data.

The first data is to-be-stored data, and the first identifier is an identifier of the first data. Based on the distributed storage system shown in FIG. 1A, the first identifier is a unique identifier of the first data in the distributed storage system.

In a possible implementation, the first data is data generated when an application or a system of a third terminal runs. After determining that the first data is not stored locally, the third terminal may generate the first identifier for the first data. The first identifier is a unique identifier of the first data in the distributed storage system. For example, the first data may be a photo taken by a user by using a camera of a terminal, and a photographing process of the terminal requests to store the photo. When the terminal determines that the photo is not stored locally, the terminal may generate a unique identifier for the photo.

In a specific implementation, the third terminal may obtain a third identifier based on information about a first process and a second mapping relationship, and determine, based on the third identifier, whether the first data is stored locally. The second mapping relationship includes a mapping relationship between the process and a storage identifier, and the storage identifier is used to identify whether the data corresponding to the process is stored locally. For the second mapping relationship, refer to related descriptions in step 202. Details are not described herein again. After obtaining the first data, if the third terminal determines, based on the third identifier, that the first data is stored non-locally, the third terminal generates the first identifier. Specifically, the first identifier is a unique identifier of the first data in the distributed storage system, and each piece of data corresponds to a different identifier. For example, a user ID, a device ID, a process identifier or a process name for storing the first data, and a number allocated to the first data may be combined, to obtain the first identifier.

The first process may be a process requesting to store or invoke the first data. The information about the first process may include a process name or a process identifier of the first process. For details, refer to related descriptions in Implementation 3 in step 202. Details are not described herein again.

In addition, if it is determined, based on the third identifier, that the first data is stored locally, the first data may be directly stored in a local storage system. In addition, the first identifier may be generated, or may not be generated.

In another possible implementation, the first data and the first identifier may be data sent by the first terminal to the third terminal. For example, after an application process or a system of the first terminal generates the first data, if determining that the first data needs to be stored across terminals, the first terminal sends the first data and the first identifier to the third terminal. The first identifier may be generated before the first terminal determines that the first data needs to be stored across terminals, or may be generated after the first terminal determines that the first data needs to be stored across terminals. For example, if a user downloads video data by using a video application on a mobile phone, after the video data is downloaded, if determining that the video data needs to be stored across terminals, the mobile phone may send the video data and a unique identifier of the video data to a tablet computer, so that the tablet computer stores the video data.

In a specific implementation, the first data may be sent by the first terminal when the first terminal determines that the first data is stored non-locally. Specifically, the first terminal may store the information about the first process of the first data and the locally stored second mapping relationship based on a request, obtain the corresponding third identifier, determine, based on the third identifier, whether the data corresponding to the first process is stored locally, and if the data corresponding to the first process is stored non-locally, send the first data to the second terminal.

In the following implementations of this application, if the first data and the first identifier are data generated by the third terminal, the first data is stored across terminals, that is, stored in another terminal in the following embodiments. If the first data and the first identifier are data sent by the first terminal, the first data may be stored in the third terminal, or may be stored in another terminal. Details are not described in the following.

1602: Determine a storage address of the first data.

After obtaining the first data and the first identifier of the first data, the third terminal determines the storage address of the first data.

Specifically, the storage address of the first data may be determined based on content of the first data. For example, the storage address of the first data may be determined based on the content of the first data by using a distributed hash table (distributed Hash table, DHT). The storage address indicates the second terminal, or the storage address indicates the second terminal and a specific logical block address in the second terminal. It is clear that the storage address may alternatively indicate the third terminal. For example, if the first data is data sent by the first terminal, the third terminal determines the storage address based on the content of the first data, and the storage address indicates the third terminal.

For example, combined operations may be performed on the content of the first data, to determine a node for storing the first data. For example, there are eight nodes, and the eight nodes may be represented by using three bits, which are separately represented as 000, 001, 010, 011, 100, 101, 110 and 111. A hash operation, for example, addition, subtraction, multiplication, division, exclusive OR, and a modulo operation on binary data obtained through converting the content of the first data, to obtain a 3-bit sequence. For example, if the obtained sequence is 010, it may be determined that a node that stores the first data is a third node, that is, it is determined that the storage address of the first data indicates the third node. A specific manner of the hash operation is similar to that in step 1604, and details are not described herein.

1603: Store the first data based on the storage address.

After the storage address of the first data is determined, the first data may be stored based on the storage address.

In a possible implementation, if the storage address indicates the second terminal, the third terminal may send a data storage request to the second terminal, and add the first data to the data storage request, to request the second terminal to store the first data. Specifically, the storage request may include a write operation and the first data, and is used to indicate the second terminal to write the first data.

It should be understood that, in this embodiment, to store data across terminals, when the first data is sent by the first terminal to the third terminal, the second terminal is different from the first terminal.

In a possible implementation, if the first data is data generated by the third terminal, when the first data needs to be stored across terminals, the storage address indicates the second terminal. The third terminal may send the first data to the second terminal, so that the second terminal stores the first data. For example, if the first data is a photo taken by using a camera of a mobile phone (namely, the third terminal), the photo may be sent to a tablet computer (namely, the second terminal), so that the tablet computer stores the photo.

In a possible implementation, if the first data is data sent by the first terminal, the storage address may indicate the third terminal, or may indicate another terminal different from the first terminal. For example, if the first data is data received by the third terminal, the obtained storage address indicates the third terminal, that is, the first data is stored in the third terminal. For example, if the first data is video data that is sent by a mobile phone and that is received by a television (namely, the third terminal), the television may locally store the video data, or may send the video data to a tablet computer, to store the video data in the tablet computer.

1604: Obtain a hash ID associated with the content of the first data.

After the first data is stored based on the storage address, the hash ID associated with the content of the first data is obtained. The hash ID is generated based on the content of the first data.

When the first data is stored in the third terminal, the hash ID may be generated by the third terminal. When the first data is stored in the second terminal, the hash ID may be generated after the second terminal stores the first data and fed back to the third terminal.

Specifically, the hash ID may be obtained by using a hash (Hash) algorithm, for example, an MD4, an MD5, or an SHA.

More specifically, a manner of obtaining the hash ID may be as follows: The third terminal or the second terminal converts the content of the first data into binary data, and performs operations such as addition, subtraction, multiplication, division, exclusive OR, and a modulo operation on the binary data, to obtain a digital sequence of a specific length, namely, the hash ID.

For example, a specific manner of generating HID (namely, the hash ID) by using the MD5 algorithm may include: HID=MD5("file name+data content"). For example, HID=MD5("/sdcard/youku/offlinedata/test.txt&showdemotesttxt")=f96b697d7cb7938d525a2f31aaf161d0 (namely, the hash ID).

For example, a specific algorithm for calculating the hash ID by using the MD5 algorithm is as follows:

1. Data Padding

Input data (namely, a file name+data content) is padded with 0 or 1, so that a bit length (a length represented in binary) of the input data is extended to N×512+448, where N is a non-negative integer, and N may be 0 or an integer greater than 0.

Padded data is grouped, each piece of 512-bit data is a group, and there are (N+1) groups in total. The (N+1) groups of data may be represented as data [0] to data [N].

2. Determine an Initialization Variable

First, a 128-bit initial link variable is determined, for example, A=0x01234567, B=0x89ABCDEF, C=0xFEDCBA98, and D=0x76543210.

3. Process the Data Groups

For each data group, namely, 512-bit data [n], data operations such as AND, OR, NOT, and XOR are performed. Specific data processing operations are as follows:

First, in a first group, the foregoing four link variables are copied into other four variables: a=A, b=B, c=C, and d=D. The 512-bit data [0] is divided into 16 groups, and each group is 32 bits.

For a, b, c, and d, the following operations are cyclically performed:

FF(a,b,c,d,Mj,s,ti), and the operation is a=b+((a+F(b,c,d)+Mj+ti)<<s).

GG(a,b,c,d,Mj,s,ti), and the operation is a=b+((a+G(b,c,d)+Mj+ti)<<s).

HH(a,b,c,d,Mj,s,ti), and the operation is a=b+((a+H(b,c,d)+Mj+ti)<<s).

II(a,b,c,d,Mj,s,ti), and the operation is a=b+((a+I(b,c,d)+Mj+ti)<<s).

It is assumed that Mj indicates a $j^{th}$ sub-group (from 0 to 15) of data [n], the constant ti is an integer part of 4294967296×abs(sin(i)), and a value of i ranges from 1 to 64 in unit of radian (4294967296 is equal to the 32nd power of 2).

In addition, the functions F, G, H, and I are defined as follows:

F(X,Y,Z)=(X&Y)|((~X)&Z);
G(X,Y,Z)=(X&Z)|(Y&(~Z));
H(X,Y,Z)=X^Y^Z; and
I(X,Y,Z)=Y^(X|(~Z)), where & is AND (And), | is OR (Or), ~ is NOT (Not), and ^ is XOR (Xor).

The operations of FF, GG, HH, and II are cyclically performed, and there are 64 steps in total.

The four rounds (64 steps in total) are as follows:
The first round (16 steps in total) is:
FF(a,b,c,d,M0,7,0xd76aa478)
FF(d,a,b,c,M1,12,0xe8c7b756)
FF(c,d,a,b,M2,17,0x242070db)
FF(b,c,d,a,M3,22,0xc1bdceee)
. . .

The second round (16 steps in total) is:
GG(a,b,c,d,M1,5,0xf61e2562)
. . .

The third round (16 steps in total) is:
HH(a,b,c,d,M5,4,0xfffa3942)
. . .

The fourth round (16 steps in total) is:
II(a,b,c,d,M0,6,0xf4292244)
. . .

After all the operations are complete, A, B, C, and D are added to a, b, c, and d respectively.

In other words, a=a+A, b=b+B, c=c+C, and d=d+D.

Then, the foregoing algorithm continues to be performed on data from a next group, namely, data [1] to data [N].

4. Output

A final output is concatenation of a, b, c, and d, that is, an output result is (a<<96)|(b<<64)|(c<<32)|d, and the result is 128-bit data, namely, the hash ID.

1605: Add a mapping relationship between the first identifier and the hash ID to the first mapping relationship.

After the hash ID of the first data is obtained, the mapping relationship between the first identifier and the hash ID may be added to the first mapping relationship.

For example, the first mapping relationship may be a mapping table, as shown in Table 4.

TABLE 4

| UUID | HID |
|---|---|
| 458731 | 10 |
| 458736 | 11 |
| 458739 | 12 |
| ... | ... |
| 943548 | 15 |

If the first identifier of the first data is 458659, and the corresponding hash ID is 08, the first identifier and the hash ID are inserted into the mapping table, as shown in Table 5.

TABLE 5

| UUID | HID |
|---|---|
| 458659 | 08 |
| 458731 | 10 |
| 458736 | 11 |
| 458739 | 12 |
| ... | ... |
| 943548 | 15 |

In a possible implementation, if the content of the first data changes, a hash ID corresponding to the changed content is obtained, and the first mapping relationship is updated based on the changed hash ID.

For example, if the first mapping relationship is the mapping table shown in Table 5, when an identifier mapped to the first identifier 458659 changes from 08 to 56, 08 in the mapping table changes to 56, as shown in Table 6.

TABLE 6

| UUID | HID |
|---|---|
| 458659 | 56 |
| 458731 | 10 |
| 458736 | 11 |
| 458739 | 12 |
| ... | ... |
| 943548 | 15 |

It should be understood that the data storage method provided in this embodiment of this application may be combined with the data reading method provided in FIG. 2 to FIG. 12A and FIG. 12B. In other words, before step 201 in FIG. 2, steps of the data storage method provided in this embodiment of this application may be performed.

Therefore, in this embodiment of this application, the third terminal maintains the mapping relationship between the first identifier and the hash ID of the data. When another terminal in the distributed storage system has data that needs to be stored across terminals, only the data and the first identifier of the data need to be sent to the third terminal, and a storage location of the data does not need to be learned of. This reduces workload of the another terminal and a volume of stored data, and increases working efficiency. In addition, it is more convenient to manage data in the distributed storage system. For example, when content of data changes, and consequently a storage location of the data changes, the third terminal only needs to update the hash ID in the first mapping relationship. Another terminal in the distributed storage system does not need to learn of a change of the storage location. This further reduces workload of the another terminal and a volume of stored data, and increases working efficiency.

Specifically, in step 1601, the third terminal obtains the first data and the first identifier in a plurality of manners. The following describe different manners by using specific scenarios as an example.

Scenario 1: The third terminal receives the first data and the first identifier.

It should be noted that the following first terminal and second terminal are any two of the plurality of terminals mentioned in FIG. 1A, and the first terminal may be the foregoing first terminal.

FIG. 17 is a schematic flowchart of another data storage method according to this application.

1701: The first terminal obtains first data.

The first data may be data generated when an application in the first terminal runs or starts, or may be data required for running a system of the first terminal, or the like. For the first data, refer to related descriptions in step 201.

For example, if video software is installed on the first terminal, the first terminal is configured to play a video. When the software runs, video data may be downloaded from a network, and the video data is used as the first data. For another example, the first terminal stores a library file required for running the system, and the library file may be used as the first data. For still another example, the first terminal may be a mobile phone, and a user may use the mobile phone to take a photo, and use the obtained photo as the first data.

1702: If the first data is stored non-locally, the first terminal generates a first identifier of the first data.

If the first terminal determines that the first data is stored non-locally, the first terminal generates a first identifier of the first data.

Before step 1702, the method further includes: The first terminal determines that whether the first data is stored locally. When determining that the first data is stored non-locally, the first terminal may generate the first identifier of the first data.

The first terminal generates the first identifier in a plurality of manners. Usually, there are a plurality of manners of generating the first identifier. A manner of generating the first identifier is not limited in this application, provided that the generated first identifier is a unique identifier in a distributed storage system. For example, the first identifier may include an ID of the first terminal, and a process name or a process identifier of a first process that requests to store the first data.

More specifically, the first terminal determines whether the first data is stored locally in a plurality of manners, and the manners may include but are not limited to one or more of the following:

In one implementation, the first terminal may determine, based on information about the first process corresponding to the first data and a second mapping relationship, whether the first data is stored locally. The second mapping relationship includes a mapping relationship between the process identifier or the process name of the process of the first terminal and a storage identifier, and the storage identifier is used to identify whether the data corresponding to the process is stored locally. For example, after the first data is obtained, the process identifier corresponding to the first data is determined. If the process identifier is not in the second mapping relationship, recursion is performed on the process identifier, to obtain a parent process identifier included in the second mapping relationship, and a storage identifier corresponding to the parent process identifier is read, to determine whether a storage location corresponding to the parent process identifier is a local location or a non-local location. Alternatively, the second mapping relationship includes only information about a process that is stored non-locally. After an ancestor process identifier of the process corresponding to the first data is obtained through recursion, if the second mapping relationship does not include the ancestor process identifier, it may be determined that the first data is stored locally. If the second mapping relationship includes the ancestor process identifier, it may be determined that the first data is stored in another terminal.

In another implementation, the first terminal may determine a storage location of the first data based on data content of the first data. Specifically, if the first data is data of a preset type, the first data is stored locally; or if the first data is data of a non-preset type, the first data is stored in another terminal. For example, if the first data is data that needs to be accessed by a plurality of terminals, the data may be stored in another terminal. If the first data is data cached when an application in the first terminal runs, and storage duration is short, the first data may be stored locally. For another example, if the first data is data such as an image or a video, the first data is stored in another terminal; or if the first data is a library file, an installation file, or the like, the first data is stored in the first terminal.

In another implementation, the first terminal may obtain an access frequency of the first data, and determine the storage location of the first data based on the access frequency of the first data, where the storage location may include a local location or a non-local location. For example, if the access frequency of the first data is higher than a threshold, the first terminal may determine that the first data is stored locally. If the access frequency of the first data is not higher than a threshold, the first terminal may determine that the first data is stored non-locally.

In another implementation, whether the storage location of the data is local or non-local may be determined by using storage space as a granularity. For example, data in a partition of a disk is stored in another terminal. If it is determined that the first data is stored in the partition, the first data is stored in another terminal. For example, if the first terminal determines to transfer data stored in a disk F to another terminal, the first terminal stores, in the another terminal, the data in the disk F as the first data.

In a possible implementation, before step 1702, the method further includes: obtaining input data of the user, and obtaining the second mapping relationship based on the input data. For details, refer to related descriptions in step 202. Details are not described herein again.

1703: The first terminal sends the first data and the first identifier to the second terminal.

After obtaining the first identifier, the first terminal sends the first data and the first identifier to the second terminal. The second terminal may be configured to maintain a mapping relationship between a unique identifier of data stored in a T-IPFS across terminals and a hash ID.

1704: The second terminal determines a storage address of the first data based on the content of the first data, and stores the first data.

1705: The second terminal obtains a hash ID associated with the content of the first data.

1706: The second terminal updates a first mapping relationship based on the first identifier and the hash ID.

It should be noted that step 1704 to step 1706 in this application are similar to step 1602 to step 1605. Details are not described herein again.

If it is determined that the first data is stored locally, the third terminal may directly invoke the local storage system to store the first data. If it is determined that the first data is stored in the second terminal, the third terminal sends the first data to the second terminal, so that the second terminal stores the first data based on the content of the first data. In addition, when the first terminal requests the first data from the third terminal, the third terminal may obtain the first data from the second terminal, and sends the first data to the first terminal.

Therefore, in the data storage method provided in this embodiment of this application, after the storage address of the data is determined, the hash ID generated based on the content of the data is obtained, and the first mapping relationship is established or updated based on the first identifier and the hash ID. The third terminal maintains the mapping relationship between the unique identifier of the data stored in the distributed storage system and the hash ID. Even if the storage location of the data changes due to changing of the content of the data, another terminal in the distributed storage system may not need to learn a changed location of the data. This reduces workload of the another terminal.

Scenario 2: The second terminal actively stores the first data.

It should be noted that the following first terminal and second terminal are any two of the plurality of terminals mentioned in FIG. 1A.

FIG. 18 is a schematic flowchart of another data storage method according to this application.

1801: A third terminal obtains first data.

The first data may be data generated when an application or a system in the third terminal runs. It should be understood that the first data may be similar to the first data in step 201.

For example, the third terminal may be a mobile phone, and a user may use the mobile phone to take a photo, and use the obtained photo as the first data. For another example, the third terminal may be a tablet computer, and a user may download video data by using the tablet computer, and use the video data as the first data.

1802: If the first data is stored non-locally, the third terminal generates a first identifier of the first data.

1803: The third terminal determines a storage address of the first data based on content of the first data.

1804: The third terminal sends the first data to the second terminal.

After the second terminal determines that the first data is stored in the third terminal, the third terminal sends the first data to a second device.

1805: The second terminal stores the first data.

After receiving the first data, the second terminal may store the first data in local storage, and generate a hash ID based on the specific storage address of the first data. For a manner of generating the hash ID, refer to related descriptions in step 1604. Details are not described herein again.

1806: The second terminal sends the hash ID to the third terminal.

1807: The third terminal updates a first mapping relationship based on the first identifier and the hash ID.

For specific content of step 1802 to step 1807 in this application, refer to step 1602 to step 1605. Details are not described herein again.

In this application, the third terminal maintains the mapping relationship between the data stored in the distributed storage system and the hash ID. Even if the storage location changes due to changing of the content of the data, another terminal may not need to learn a changed location of the data. This reduces workload of the another terminal. The third terminal may alternatively actively store the data in another terminal. When the data needs to be read, efficient and accurate content-based data reading can be implemented.

The following describes the third terminal provided in this application. The third terminal is applied to the foregoing distributed storage system, and is configured to perform the data storage method provided in FIG. 16 to FIG. 18.

Figure 19:
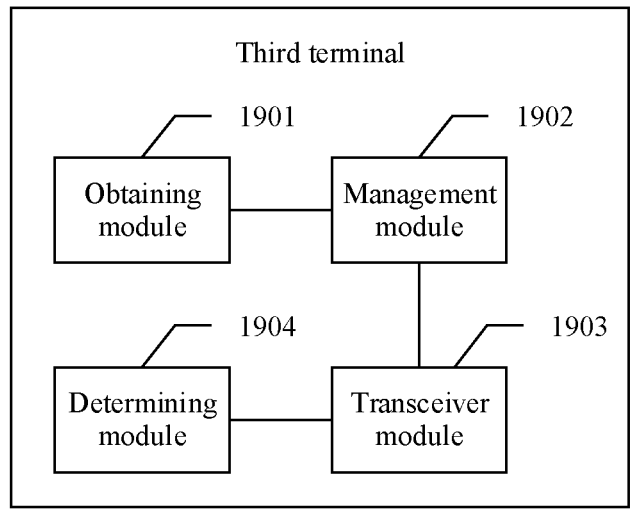
FIG. 19 is a schematic diagram of a structure of a third terminal according to this application.

FIG. 19 is a schematic diagram of a structure of a third terminal according to this application.

The third terminal includes an obtaining module 1901 and a management module 1902.

The obtaining module 1901 is configured to obtain first data and a first identifier corresponding to the first data, where the first identifier is a unique identifier of the first data in a distributed storage system.

The management module 1902 is configured to: determine a storage address of the first data, obtain a hash ID associated with content of the first data, and add a mapping relationship between the first identifier and the hash ID to a first mapping relationship, where the first mapping relationship includes a mapping relationship between the unique identifier of the data in the distributed storage system and the hash ID, and the storage address is used to store the first data.

Optionally, the third terminal further includes a transceiver module 1903.

The management module 1902 is specifically configured to determine, based on the content of the first data, a second terminal that stores the first data, that is, the storage address of the first data indicates the second terminal.

The transceiver module 1903 is configured to send a data storage request to the second terminal. The data storage request includes the first data, and the data storage request is used to request the second terminal to store the first data.

The transceiver module 1903 is further configured to receive the hash ID sent by the second terminal.

Optionally, the obtaining module 1901 is specifically configured to receive the first data and the first identifier that are sent by a first terminal.

Optionally, the first terminal sends the first data and the first identifier when determining, based on information about a first process corresponding to the first data and a second mapping relationship, that the first data is stored non-locally. The second mapping relationship includes a mapping relationship between the process and a storage identifier, and the storage identifier is used to identify whether the data corresponding to the process is stored locally.

Optionally, the obtaining module 1901 is specifically configured to obtain the first data and generate the first identifier.

Optionally, the third terminal further includes a determining module 1904.

The determining module 1904 is specifically configured to obtain a third identifier based on the information about the first process and the second mapping relationship, and determine, based on the third identifier, whether the first data is stored locally. The second mapping relationship includes the mapping relationship between the process and the storage identifier, and the storage identifier is used to identify whether the data of the corresponding process is stored locally.

For example, the following describes a specific structure of the third terminal provided in this application.

Structure 1

Figure 20:
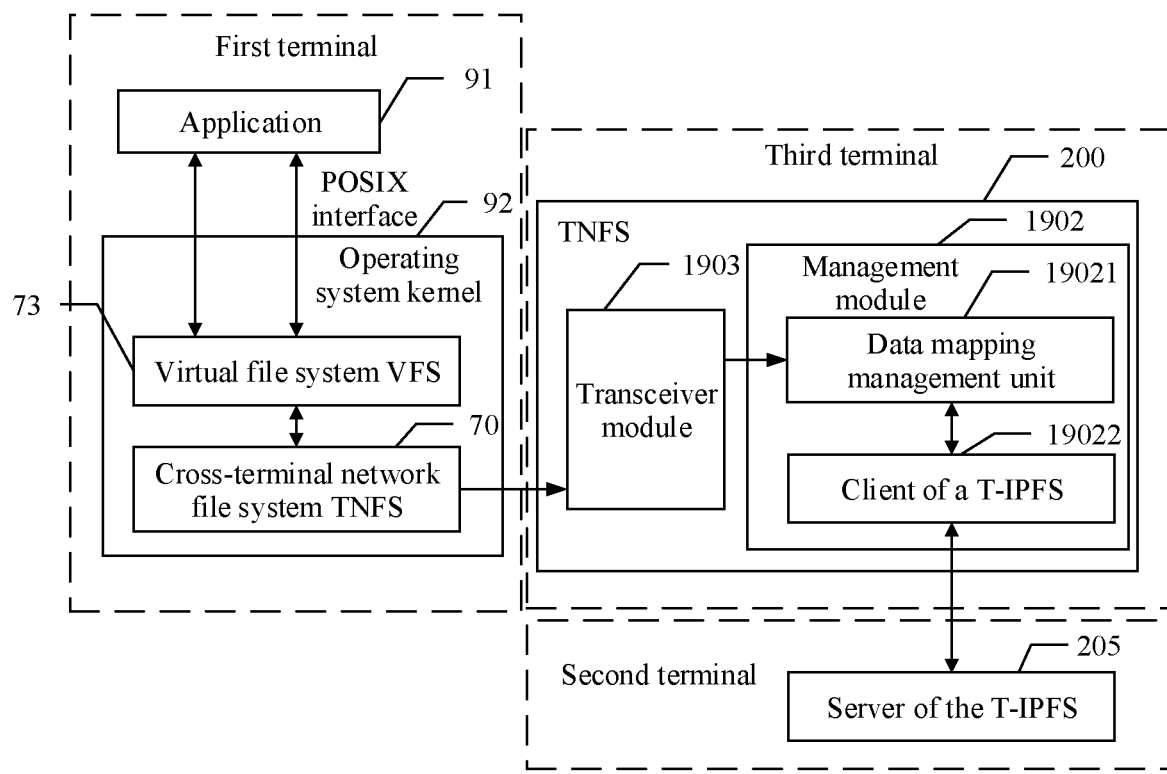
FIG. 20 is a schematic diagram of a structure of another third terminal according to this application.

Refer to FIG. 20. A first terminal and a third terminal are included.

The first terminal is the same as the first terminal in FIG. 9 and FIG. 10. Details are not described herein again.

The third terminal includes the transceiver module 1903 and the management module 1902. The management module 1902 may specifically include a data mapping management unit and a client of a T-IPFS.

The first data may be data generated by an application 91. When it is determined that the first data is not stored in the first terminal, the first data and the first identifier of the first data are sent to the transceiver module 1903 by using a TNFS 70.

After receiving the first data and the first identifier, the transceiver module 1903 transfers the first data and the first identifier to the data mapping management unit 19021. In other words, the transceiver module performs step 1703 in FIG. 17.

The data mapping management unit 19021 determines, based on the content of the first data, that the storage address for storing the first data indicates the second terminal, and sends the first data to the second terminal by using the client 19022 of the T-IPFS.

After receiving the first data, a server 205 of the T-IPFS of the second terminal stores the first data based on the content of the first data, generates the hash ID based on the content of the first data, and feeds back the hash ID to the client 19022 of the T-IPFS.

The client 19022 of the T-IPFS feeds back the hash ID to the data mapping management unit 19021, and the data mapping management unit 19021 updates the first mapping relationship based on the hash ID, that is, adds the mapping relationship between the first identifier of the first data and the hash ID to the first mapping relationship.

Structure 2

Figure 21:
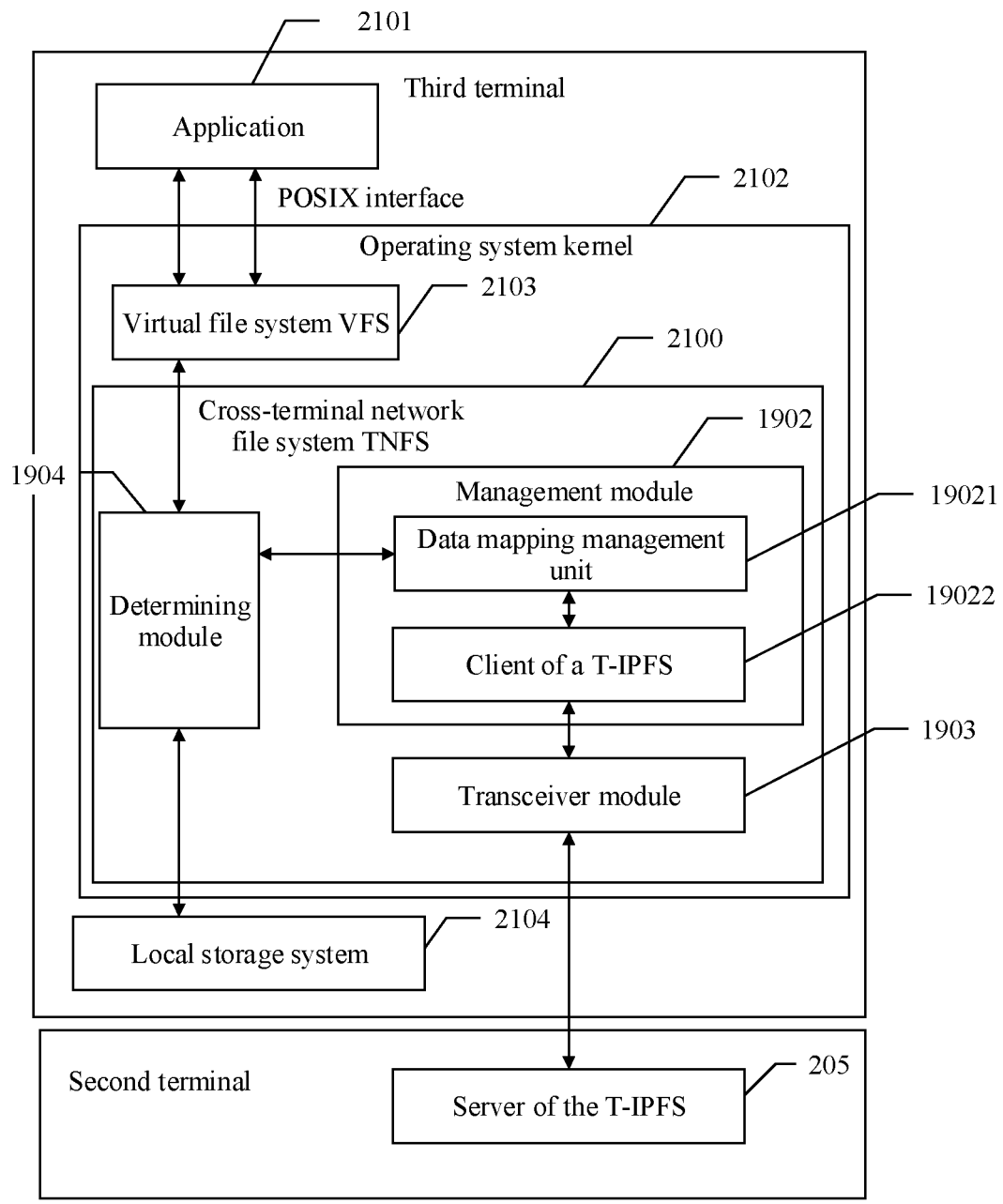
FIG. 21 is a schematic diagram of a structure of another third terminal according to this application.

FIG. 21 is a schematic diagram of a structure of another third terminal according to this application.

Structures of an application 2101, a VFS 2103, and a local storage system 2104 that are included in the third terminal are similar to a structure of the first terminal shown in FIG. 9 and FIG. 10. Similar parts are not described herein again. A difference lies in that the foregoing data reading module is replaced with the management module 1902 and the transceiver module 1903.

The first data may be data generated by the application 2101. For details, refer to related descriptions in step 201.

The application 2101 transmits the first data to the VFS 2103 by using a POSIX interface, and transmits the first data to the determining module 1904 by using the VFS 2103.

The determining module 1904 determines whether the first data is stored locally. For a specific determining manner, refer to related descriptions in step 1602 in FIG. 16. Details are not described herein again.

When determining that the first data is stored non-locally, the determining module 1904 transfers the first data and the first identifier of the first data to the data mapping management unit 19021. The first identifier may be generated by the determining module, or may be transferred to the determining module after being generated by another module, for example, a metadata management module.

The data mapping management unit 19021 transfers the first data to the client 19022 of the T-IPFS after receiving the first data and the first identifier. The client 19022 of the T-IPFS determines the storage address of the first data based on the content of the first data, where the storage address indicates the second terminal, and then sends the first data to the server 205 of the T-IPFS by using the transceiver module.

After receiving the first data, a server 205 of the T-IPFS stores the first data based on the content of the first data, generates the hash ID of the first data based on the content of the first data, and feeds back the hash ID to the client 19022 of the T-IPFS.

The client 19022 of the T-IPFS feeds back the hash ID to the data mapping management unit 19021, and the data mapping management unit 19021 updates the first mapping relationship based on the hash ID, that is, adds the mapping relationship between the first identifier and the hash ID to the first mapping relationship.

Figure 22:
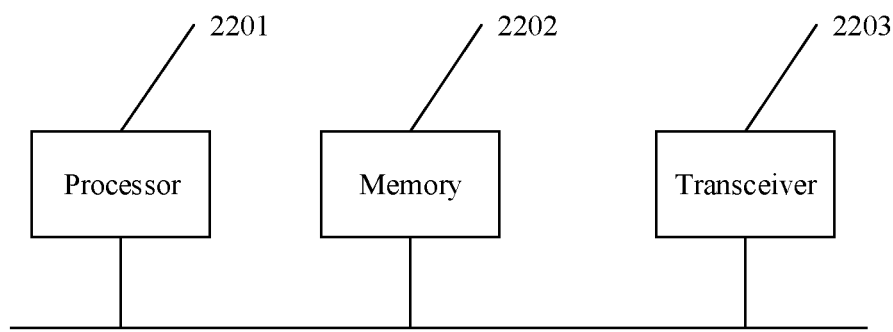
FIG. 22 is a schematic diagram of a structure of another first terminal according to this application.

FIG. 22 is a schematic diagram of a structure of another first terminal according to this application.

The first terminal may include a processor 2201, a memory 2202, and a transceiver 2203. The processor 2201, the memory 2202, and the transceiver 2203 are interconnected by using a line. The memory 2202 stores program instructions and data.

The memory 2202 stores the program instructions and the data corresponding to steps performed by the first terminal in FIG. 2, FIG. 3, FIG. 6, and FIG. 17.

The processor 2201 and the transceiver 2203 are configured to perform the method steps performed by the first terminal shown in any one of the foregoing embodiments in FIG. 2, FIG. 3, FIG. 6, and FIG. 17.

In FIG. 2, the processor 2201 may be configured to perform step 201, step 202, step 203, or step 205. In FIG. 3, the processor 2201 is configured to perform step 301, step 302, and step 303. In FIG. 6, the processor 2201 is configured to perform step 601 to step 604. In FIG. 17, the processor 2201 is configured to perform step 1701 and step 1702.

In FIG. 2, the transceiver 2203 may be configured to perform step 204. In FIG. 3, the transceiver 2203 is configured to perform step 304 and step 307. In FIG. 6, the transceiver 2203 is configured to perform step 605 and step 607. In FIG. 17, the transceiver 2203 is configured to perform step 1703.

Figure 23:
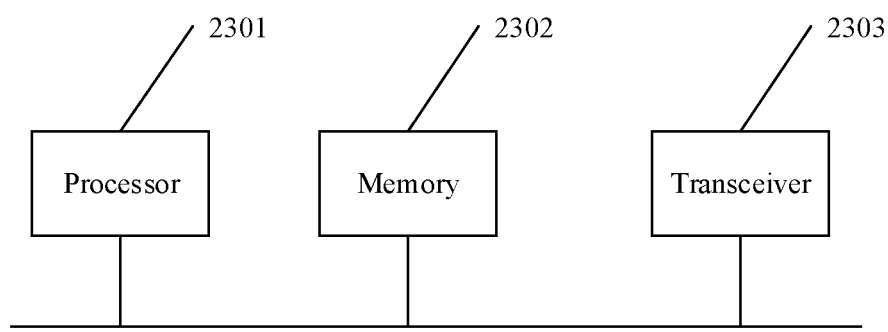
FIG. 23 is a schematic diagram of a structure of another third terminal according to this application.

FIG. 23 is a schematic diagram of a structure of another third terminal according to this application.

The third terminal may include a processor 2301, a memory 2302, and a transceiver 2303. The processor 2301, the memory 2302, and the transceiver 2303 are interconnected by using a line. The memory 2302 stores program instructions and data.

The memory 2302 stores the program instructions and the data corresponding to steps performed by the third terminal in FIG. 3, FIG. 6, and FIG. 16 to FIG. 18.

The processor 2301 and the transceiver 2303 are configured to perform the method steps performed by the third terminal shown in any one of the foregoing embodiments in FIG. 3, FIG. 6, and FIG. 16 to FIG. 18.

In FIG. 3, the processor 2301 may be configured to perform step 305 and step 306. In FIG. 6, the processor 2301 is configured to perform step 606. In FIG. 16, the processor 2301 is configured to perform step 1601 to step 1605. In FIG. 17, the processor 2301 is configured to perform step 1704 to step 1706. In FIG. 18, the processor 2301 is configured to perform step 1801 to step 1803 and step 1807.

In FIG. 3, the transceiver 2303 may be configured to perform step 304 and step 307. In FIG. 6, the transceiver 2303 is configured to perform step 605 and step 607. In FIG. 17, the transceiver 2303 is configured to perform step 1703. In FIG. 18, the transceiver 2303 is configured to perform step 1804 and step 1806.

An embodiment of this application further provides a distributed storage system. The distributed storage system includes a plurality of terminals, and the plurality of terminals are configured to perform steps of the method in any embodiment in FIG. 2 to FIG. 18.

An embodiment of this application further provides a digital processing chip. A circuit and one or more interfaces that are configured to implement functions of the processor 2201 or the processor 2301 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through an interface. The digital processing chip implements, based on program code stored in the external memory, the actions performed by the first terminal or the third terminal in the foregoing embodiments.

A person of ordinary skill in the art may understand that all or some steps for implementing the foregoing embodiments may be implemented by using hardware or a program instructing related hardware. The program may be stored in a computer-readable storage medium. The storage medium mentioned above may be a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether these functions are performed by hardware or software depends on particular applications and design constraints of the technical solutions. A person skilled in the art may use different methods to implement the described functions for each particular application, but it should not be considered that the implementation goes beyond the scope of this application.

When the software is used to implement embodiments, all or some of embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like.

In the specification, claims, and accompanying drawings of this application, terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include" and "have" and any other variants are intended to cover the non-exclusive inclusion. For example, a procedure, method, system, product, or device that includes a list of steps or units is not necessarily limited to those expressly listed steps or units, but may include other steps or units not expressly listed or inherent to such a procedure, method, product, or device.

Finally, it should be noted that the foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first terminal in a distributed storage system, comprising:
   a memory storing executable instructions;
   a processor configured to execute the executable instructions to:
   obtain a first data identifier identifying first data that the first terminal needs to read;
   determine, based on the first data identifier, whether the first data is local data;
   when the first data is not local data, obtain a first identifier of the first data, wherein the first identifier is a unique identifier that uniquely identifies the first data in the distributed storage system and is a character string of a Varchar(64) type;
   obtain, from a mapping table based on the first identifier, a hash identifier derived from content of the first data, wherein the mapping table stores a correspondence between the first identifier and the hash identifier;
   obtain, based on the hash identifier, a read address indicating that the first data is stored on a second terminal in the distributed storage system; and
   retrieving the first data from the second terminal.

2. The first terminal according to claim 1, wherein the processor is further configured to:
   receive an access request for the first data, wherein the first data identifier is obtained based on the access request for the first data.

3. The first terminal according to claim 1,
   wherein the processor is configured to retrieve the first data by:
   determining, based on the read address corresponding to the hash identifier, the second terminal that stores the first data;
   sending a read request to the second terminal; and
   receiving the first data sent by the second terminal based on the read request.

4. The first terminal according to claim 1, wherein the processor is further configured to:
   send the first identifier to a third terminal in the distributed storage system to enable the third terminal to read the first data from the second terminal based on the first identifier; and
   receive the first data from the third terminal.

5. The first terminal according to claim 1, wherein the first data identifier indicates whether the first data is local data, and the first data identifier is obtained based on a file name of the first data.

6. The first terminal according to claim 5, wherein the first data identifier is storage path information obtained based on the file name of the first data, and wherein the processor is configured to determine whether the first data is local data based on the storage path information.

7. The first terminal according to claim 1, wherein the first data identifier comprises information about a first process corresponding to the first data, and the processor is configured to determine, based on the information about the first process and a second mapping relationship, whether the first data is local data, wherein the second mapping relationship is between a process and a storage identifier, and the storage identifier is used to identify whether data of a corresponding process is stored locally.

8. The first terminal according to claim 7, wherein the second mapping relationship is obtained based on data input by a user.

9. The first terminal according to claim 1, wherein the first data is data is determined based on an input operation and that a user requests to access, or the first data is data that a process in the first terminal requests to invoke.

10. A method of reading data performed by a first terminal in a distributed storage system, the method comprising:
    obtaining a first data identifier associated with first data that first terminal needs to read;
    determining based on the first data identifier, whether first data is local data;
    when the first data is non-local data, obtaining a first identifier of the first data, wherein the first identifier is a unique identifier that uniquely identifies the first data in the distributed storage system and is a character string of a varchar(64) type;
    obtaining, from a mapping table based on the first identifier, a hash identifier derived from content of the first data, wherein the mapping table stores a correspondence between the first identifier and the hash identifier;
    obtaining, based on the hash identifier, a read address of the first data, wherein the read address of the first data indicates that the first data is stored on a second terminal in the distributed storage system; and
    retrieving the first data from the second terminal.

11. The method according to claim 10, further comprising:
    receiving an access request for the first data; wherein the step of obtaining the first data identifier obtains the first data identifier based on the access request.

12. The method according to claim 10,
    wherein the step of retrieving the first data comprises:
    determining, based on the read address corresponding to the hash identifier, the second terminal that stores the first data;
    sending a read request to the second terminal; and
    receiving the first data sent by the second terminal based on the read request.

13. The method according to claim 10, wherein the first data identifier is used to identify whether the first data is local data, and the first data identifier is obtained based on a file name of the first data.

14. The method according to claim 10, wherein the first data identifier is storage path information obtained based on the file name of the first data, and the step of determining whether the first data is local data determines whether the first data is local data based on the storage path information.

15. The method according to claim 10, wherein the first data identifier comprises information about a first process corresponding to the first data, and wherein the step of determining whether first data is local data determines whether the first data is local data based on the information about the first process and a second mapping relationship, wherein the second mapping relationship comprises a mapping relationship between the first process and a storage identifier, and the storage identifier is used to identify whether data of a corresponding process is stored locally.

16. The method according to claim 15, wherein the second mapping relationship is obtained based on data input by a user.

17. The method according to claim 10, wherein the first data is determined based on an input operation and that a user requests to access, or the first data is data that a process in the first terminal requests to invoke.

\* \* \* \* \*